US012798394B2

(12) United States Patent
Ichinose et al.

(10) Patent No.: US 12,798,394 B2
(45) Date of Patent: Nov. 17, 2026

(54) ELECTRICALLY DRIVEN HAULAGE VEHICLE

(71) Applicant: Hitachi Construction Machinery Co., Ltd., Tokyo (JP)

(72) Inventors: Masanori Ichinose, Chiyoda-ku (JP); Shinichi Uotsu, Tsuchiura (JP); Nobuyoshi Takahashi, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 68 days.

(21) Appl. No.: 19/109,864

(22) PCT Filed: Oct. 4, 2023

(86) PCT No.: PCT/JP2023/036152

§ 371 (c)(1),
(2) Date: Mar. 7, 2025

(87) PCT Pub. No.: WO2024/075759

PCT Pub. Date: Apr. 11, 2024

(65) Prior Publication Data

US 2026/0077658 A1 Mar. 19, 2026

(30) Foreign Application Priority Data

Oct. 6, 2022 (JP) ................................ 2022-161963

(51) Int. Cl.
*B60L 15/20* (2006.01)
*B60K 6/46* (2007.10)

(52) U.S. Cl.
CPC ................ *B60L 15/20* (2013.01); *B60K 6/46* (2013.01); *B60L 2200/40* (2013.01);
(Continued)

(58) Field of Classification Search
CPC .... B60K 6/00; B60K 6/26; B60K 6/46; B60L 15/20; B60L 2200/40; B60L 2220/12;
(Continued)

(56) References Cited

U.S. PATENT DOCUMENTS 11,407,316 B2 * 8/2022 Ito .......................... B60K 6/387
12,663,276 B2 * 6/2026 Jeong ................. G01C 21/3469
(Continued)

FOREIGN PATENT DOCUMENTS

CN 111032466 B * 10/2022 ............ B60W 10/08
DE 102018101986 A1 * 8/2018 ........... F01N 3/0842
(Continued)

OTHER PUBLICATIONS

International Search Report (PCT/ISA/210) issued in PCT Application No. PCT/JP2023/036152 dated Dec. 26, 2023 with English translation (5 pages).

(Continued)

*Primary Examiner* — Babar Sarwar
(74) *Attorney, Agent, or Firm* — Crowell & Moring LLP

(57) ABSTRACT

An electrically driven haulage vehicle travels by a driving force of an electrically driven motor driven by being supplied with electric power from a generator driven by an engine. A controller that controls the electrically driven motor includes an engine speed determining section that determines whether an engine speed as a sensed value of an engine speed sensor is equal to or higher than an engine speed threshold value when a vehicle start instruction is input, an elapsed time determining section that determines whether a first elapsed time measured from a time point at which it is determined that the sensed value is equal to or higher than the engine speed threshold value has reached a time threshold value, and a start determining section that determines whether a vehicle speed as a sensed value of a
(Continued)

speed sensor is equal to or higher than a speed threshold value after it is determined that the first elapsed time has reached the time threshold value. The controller stops the electrically driven motor when it is determined that the sensed value of the speed sensor is lower than the speed threshold value.

8 Claims, 12 Drawing Sheets

(52) U.S. Cl.
CPC ....... *B60L 2240/12* (2013.01); *B60L 2240/26* (2013.01); *B60L 2240/42* (2013.01); *B60L 2240/441* (2013.01); *B60L 2240/642* (2013.01); *B60Y 2200/92* (2013.01)

(58) Field of Classification Search
CPC ............. B60L 2220/44; B60L 2240/12; B60L 2240/26; B60L 2240/42; B60L 2240/421; B60L 2240/423; B60L 2240/441; B60L 2240/642; B60L 50/13; B60L 9/18; B60W 10/06; B60W 10/08; B60W 20/15; B60W 2300/125; B60W 2510/0638; B60W 2520/10; B60W 2530/10; B60W 2530/16; B60W 2552/15; B60W 2552/20; B60Y 2200/92; F02D 2200/101; F02D 29/06; F02D 31/001; G01G 19/12
See application file for complete search history.

(56) References Cited

U.S. PATENT DOCUMENTS

| | | | | |
|---|---|---|---|---|
| 2011/0213517 | A1* | 9/2011 | Laws ...................... | B60L 58/12 180/65.265 |
| 2013/0332020 | A1* | 12/2013 | Uchihara .............. | B60W 10/08 180/65.265 |
| 2014/0316626 | A1* | 10/2014 | Amano ................. | B60W 10/08 701/22 |
| 2016/0325748 | A1 | 11/2016 | Mori et al. | |
| 2017/0144650 | A1* | 5/2017 | Nagamiya ............. | B60W 20/12 |
| 2017/0355358 | A1* | 12/2017 | Ogawa .................. | B60W 10/00 |

FOREIGN PATENT DOCUMENTS

| | | | | |
|---|---|---|---|---|
| EP | 3836386 | A1 * | 6/2021 | ............ B60L 15/007 |
| JP | 2012-116360 | A | 6/2012 | |
| JP | 2016-158451 | A | 9/2016 | |
| JP | 2021-93873 | A | 6/2021 | |
| WO | WO 2015/136664 | A1 | 9/2015 | |
| WO | WO-2016113810 | A1 * | 7/2016 | ............. B60H 1/034 |

OTHER PUBLICATIONS

Japanese-language Written Opinion (PCT/ISA/237) issued in PCT Application No. PCT/JP2023/036152 dated Dec. 26, 2023 with English translation (5 pages).
International Preliminary Report on Patentability (PCT/IB/338 & PCT/IB/373) issued in PCT Application No. PCT/JP2023/036152 dated Apr. 17, 2025, including English translation of Written Opinion (PCT/ISA/237) (5 pages).

* cited by examiner

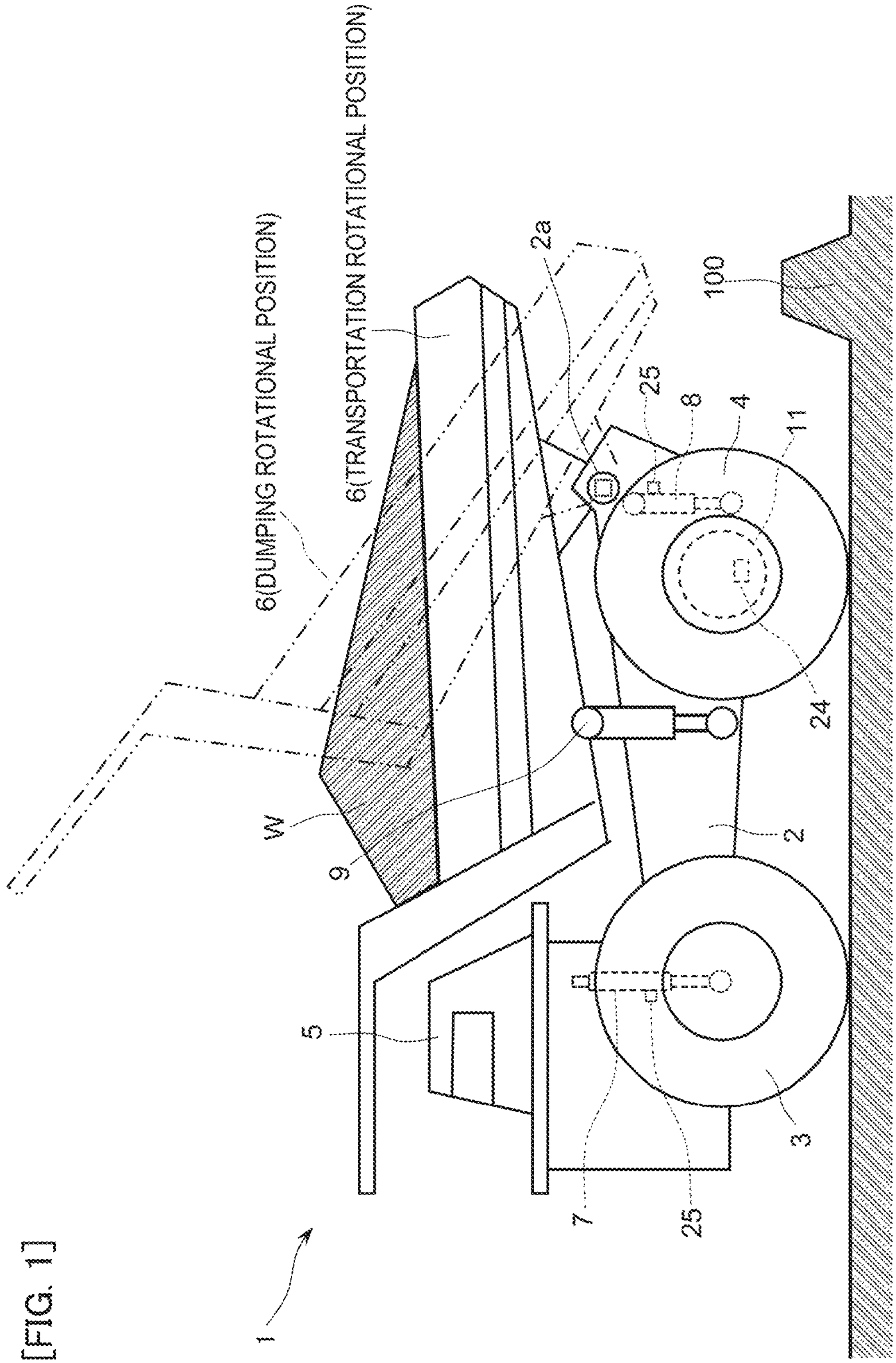
[FIG. 1]

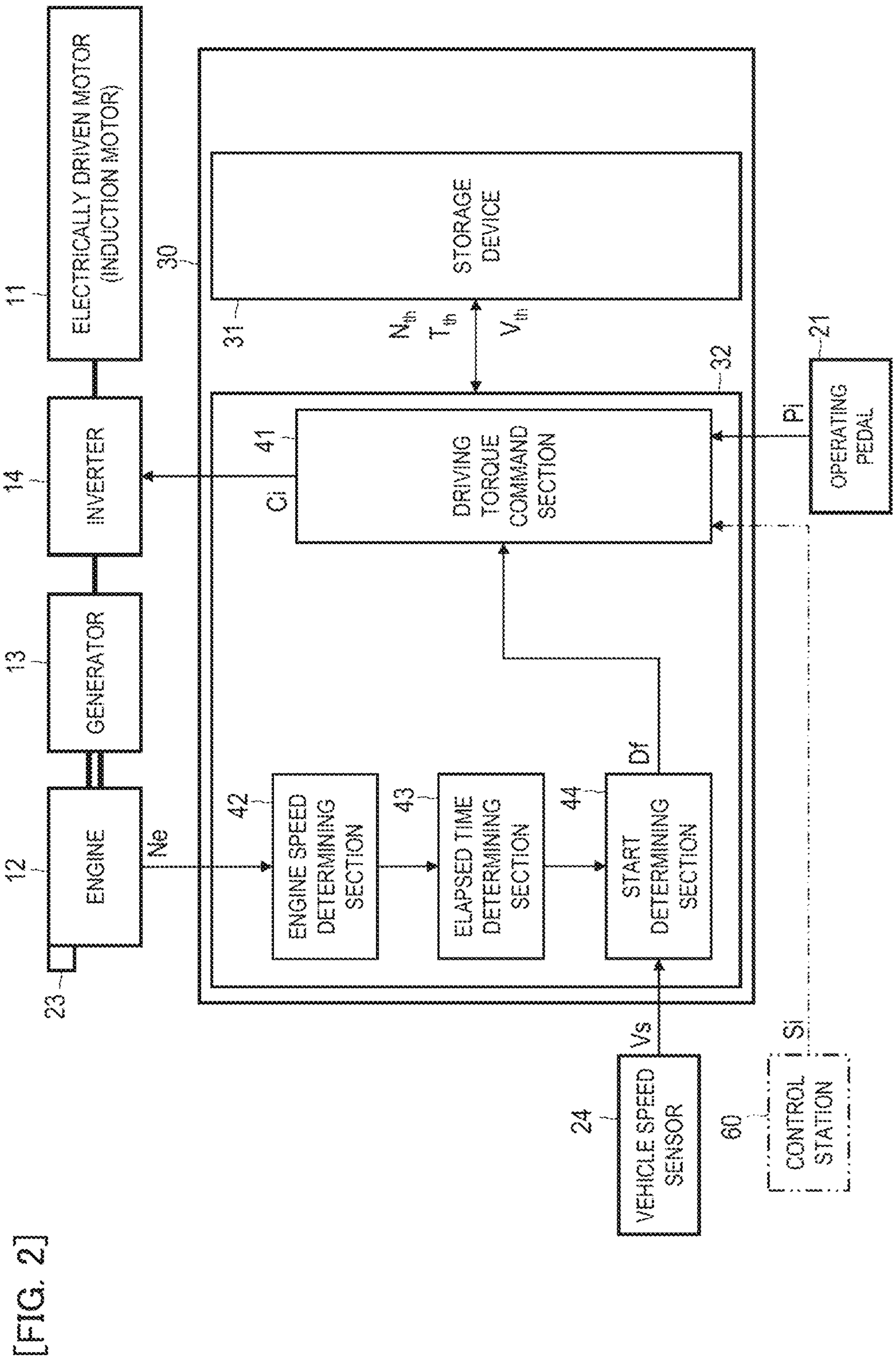
[FIG. 2]

[FIG. 3]
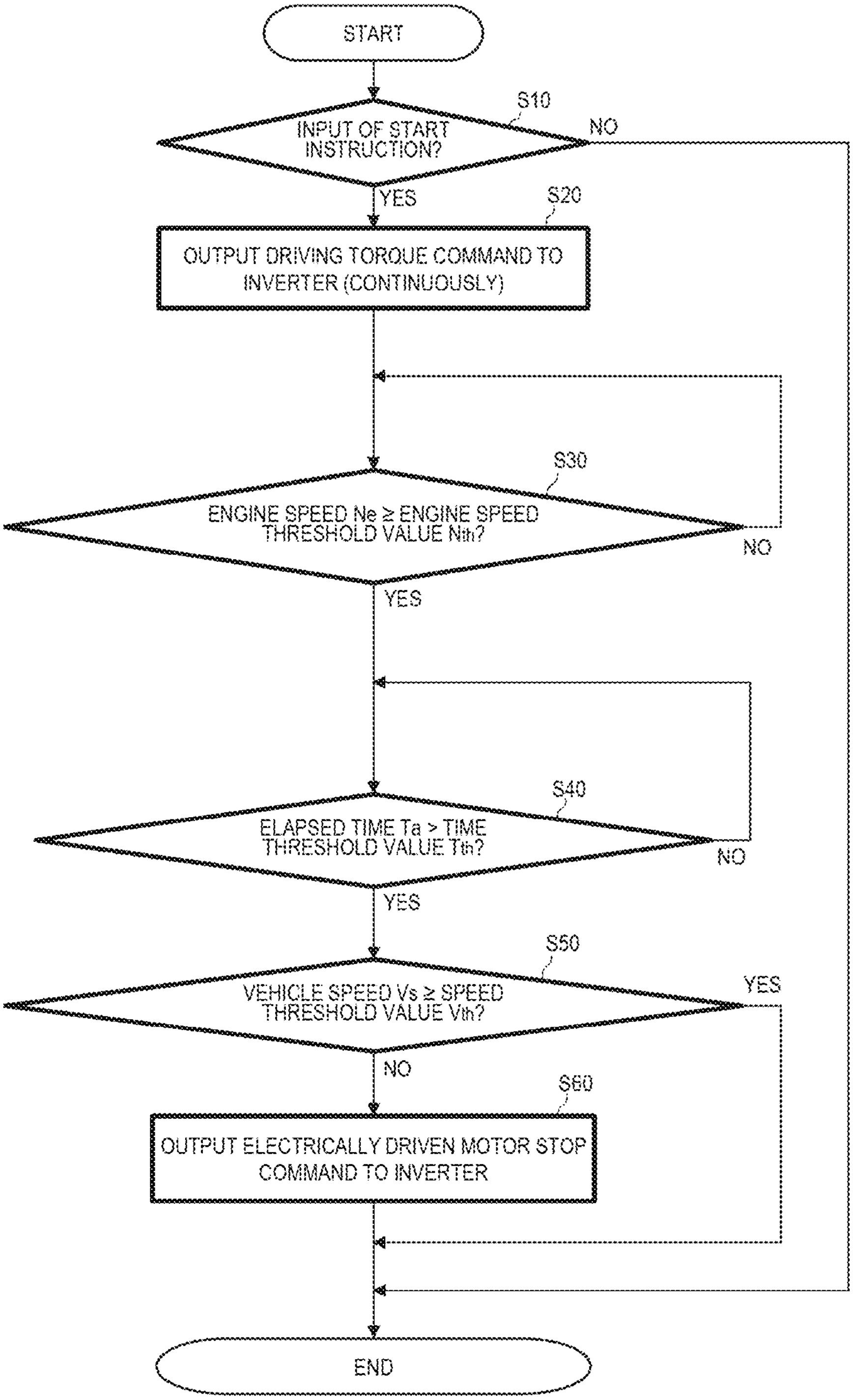

[FIG. 4]
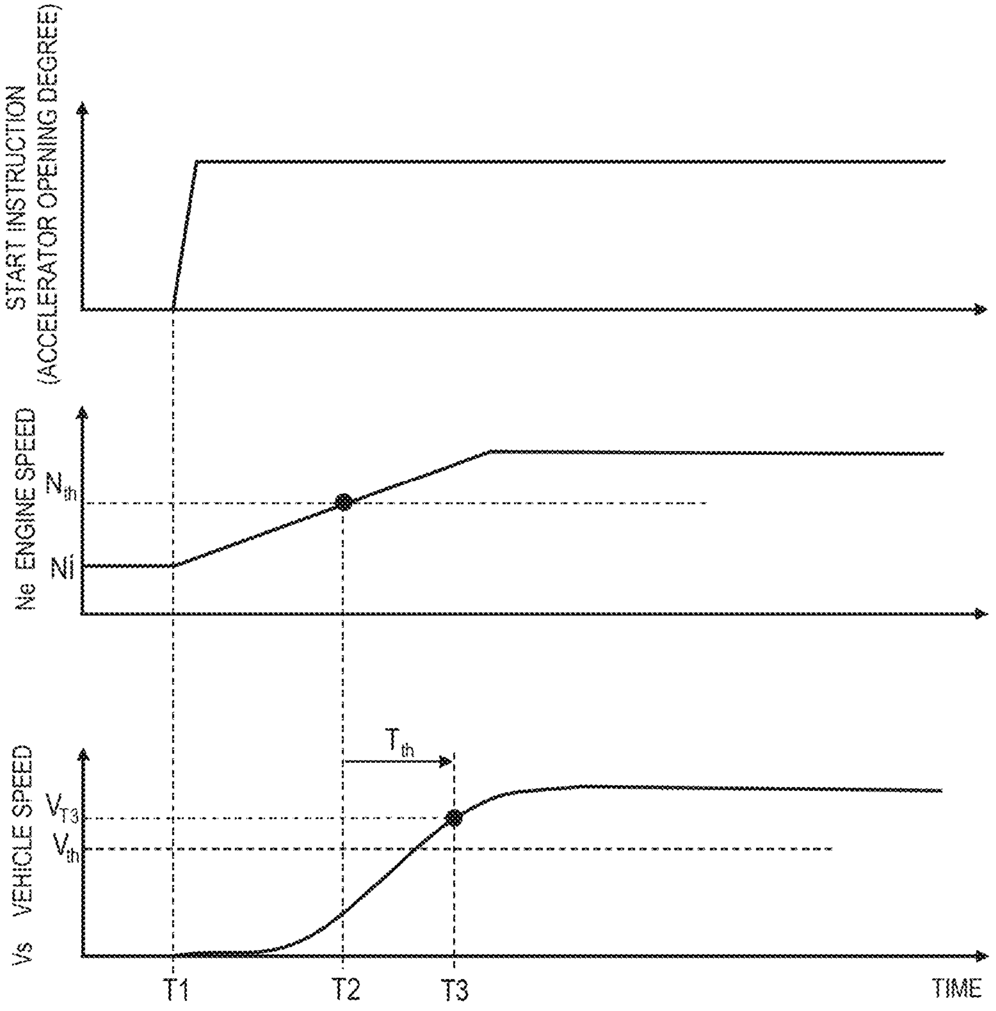

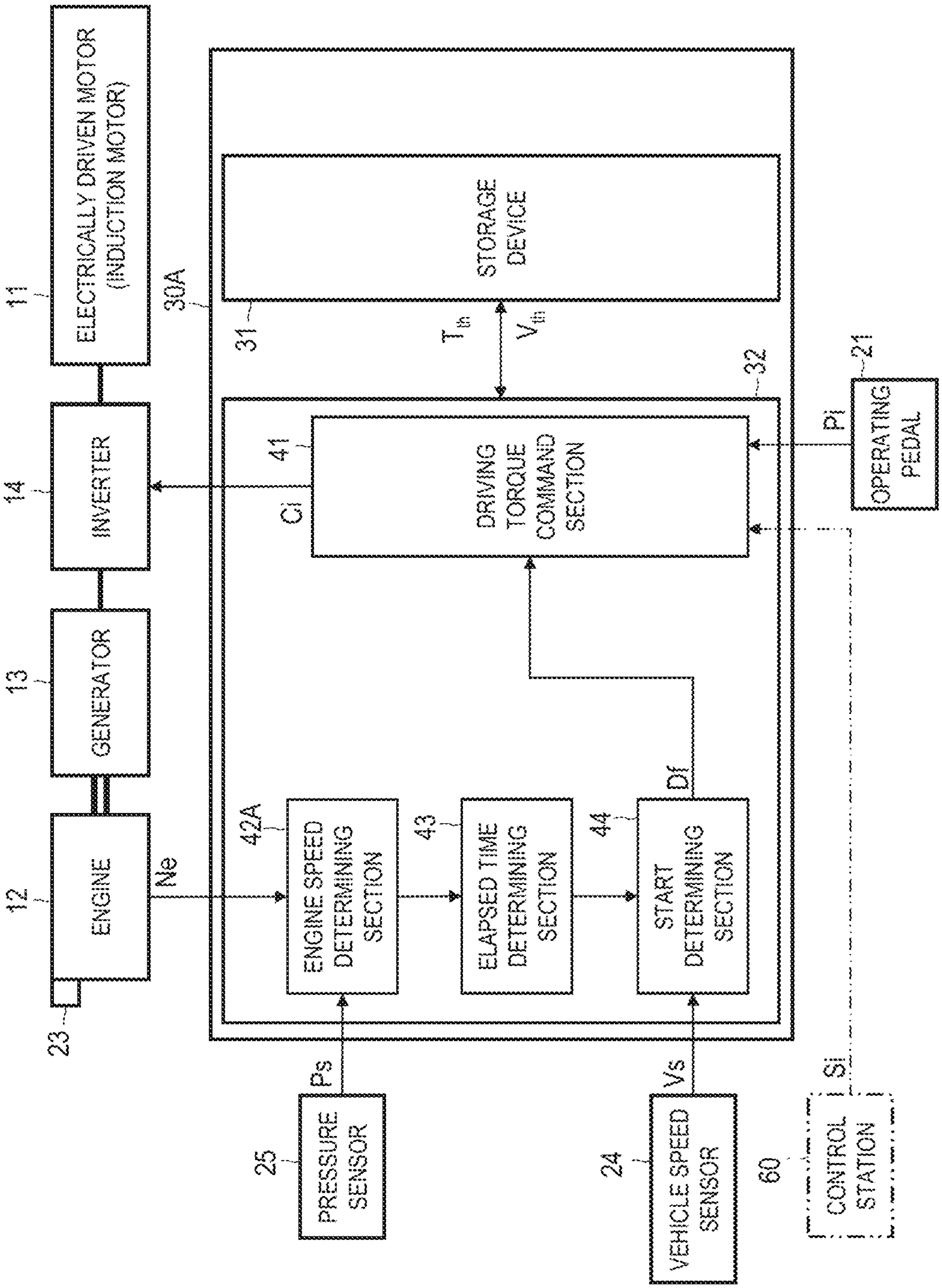
[FIG. 5]

[FIG. 6]
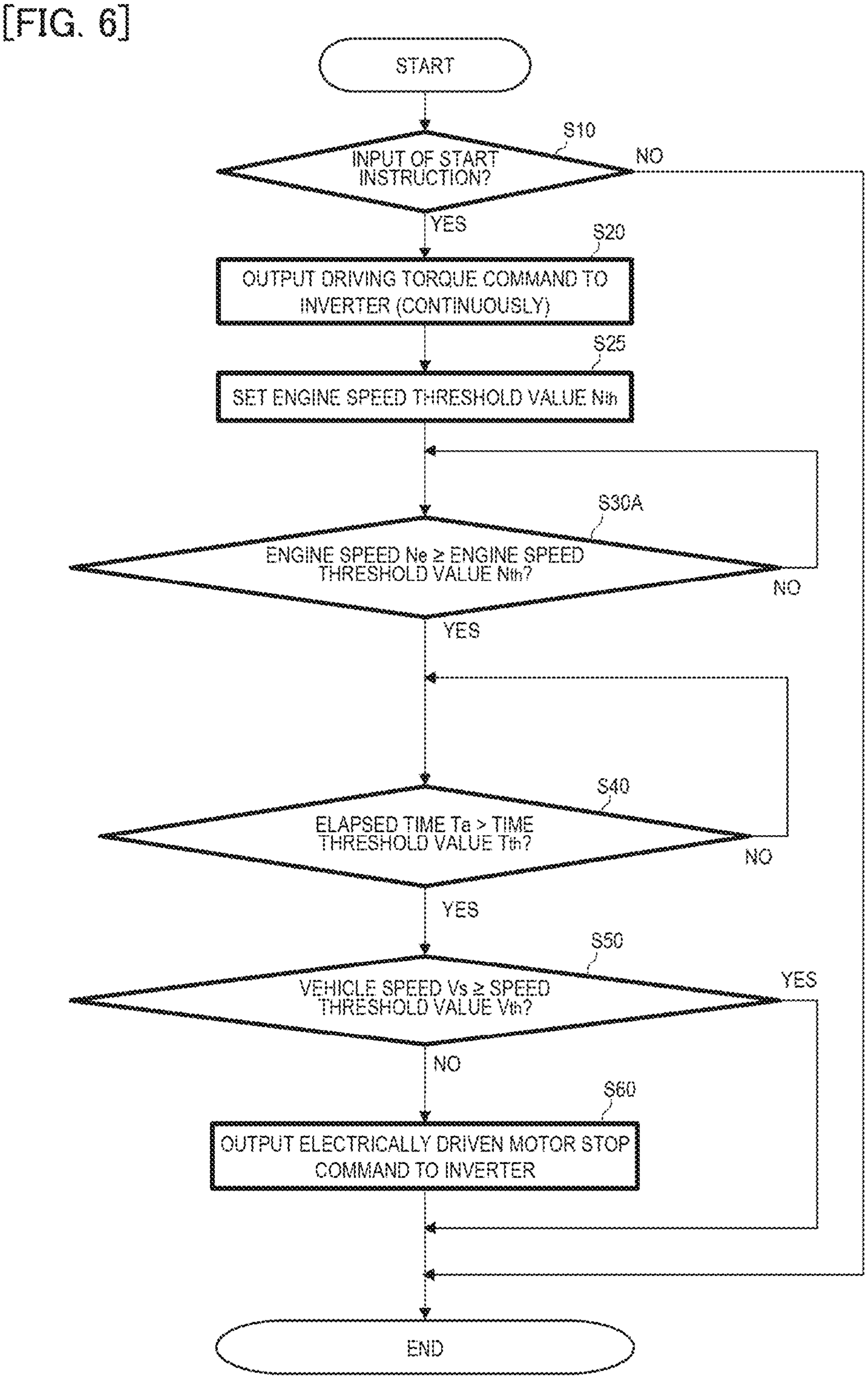

[FIG. 7]
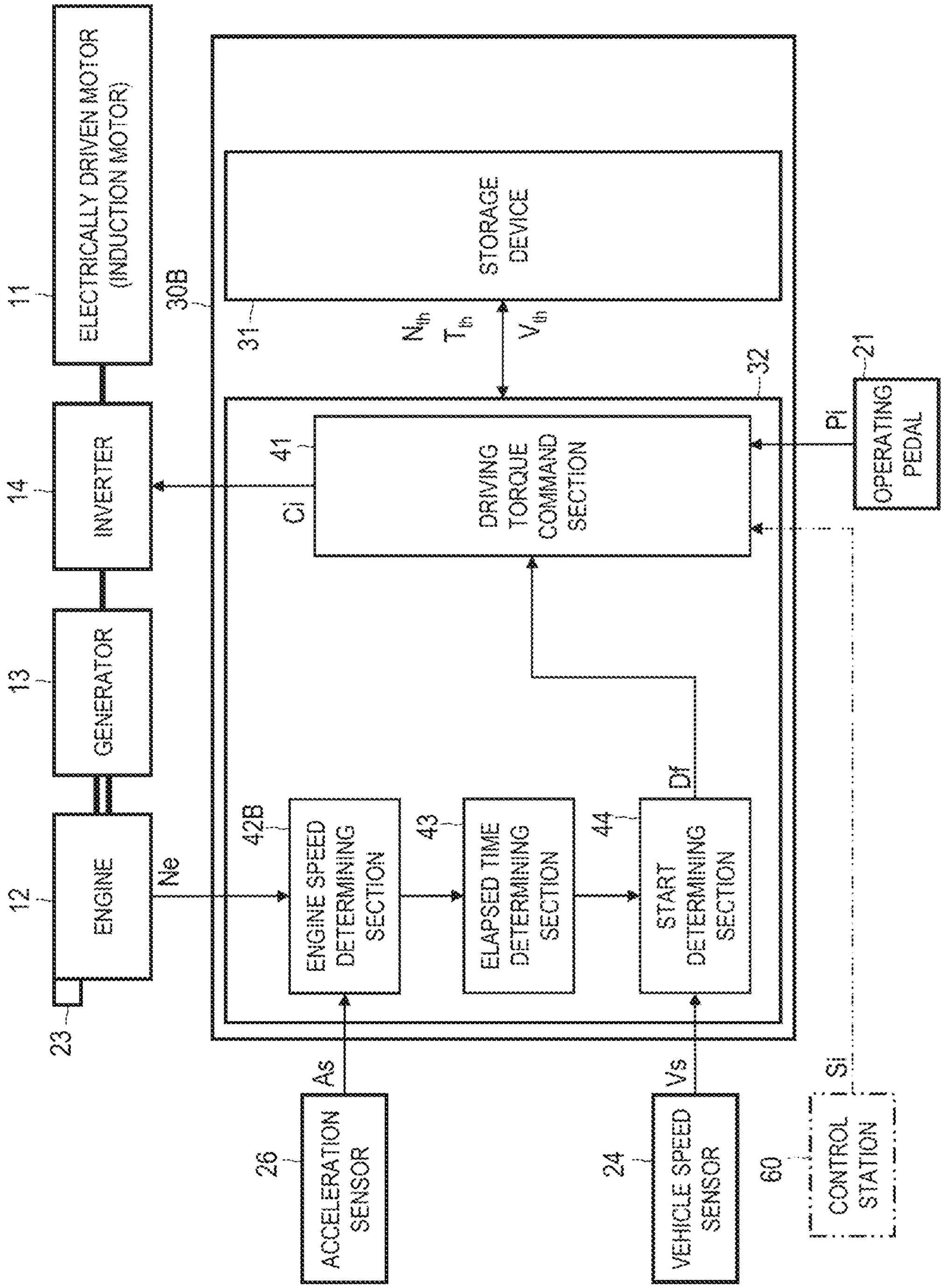

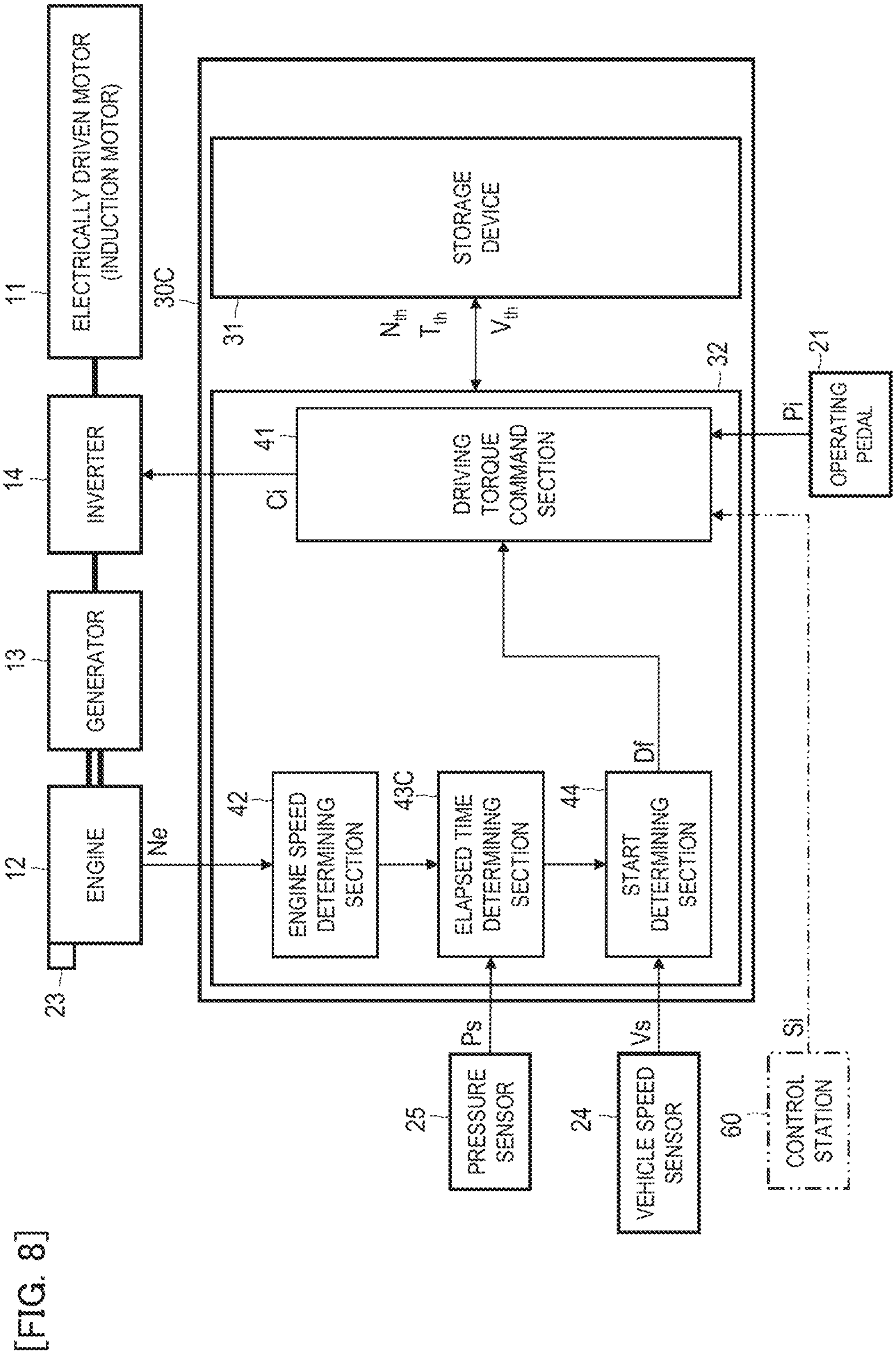
[FIG. 8]

[FIG. 9]
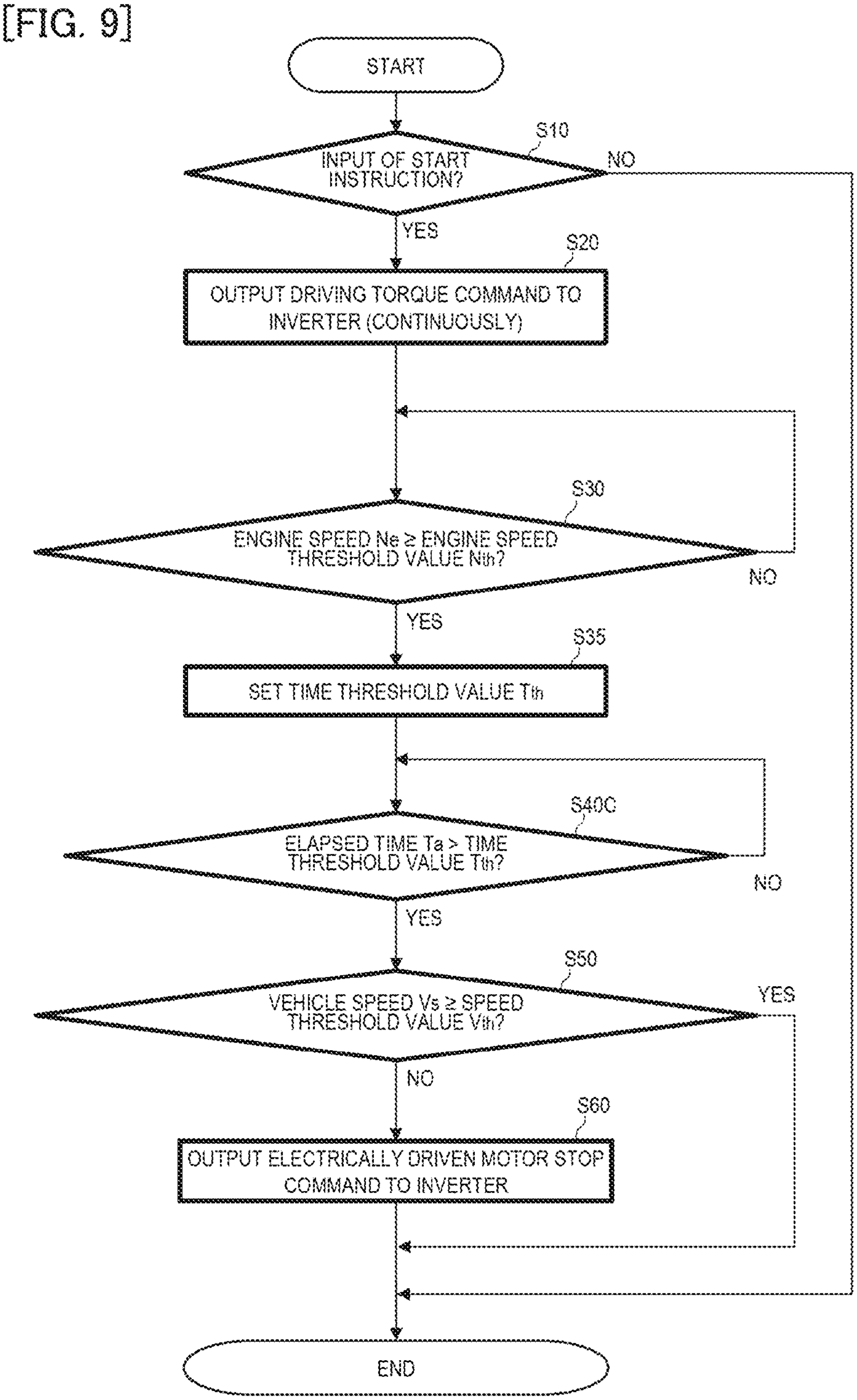

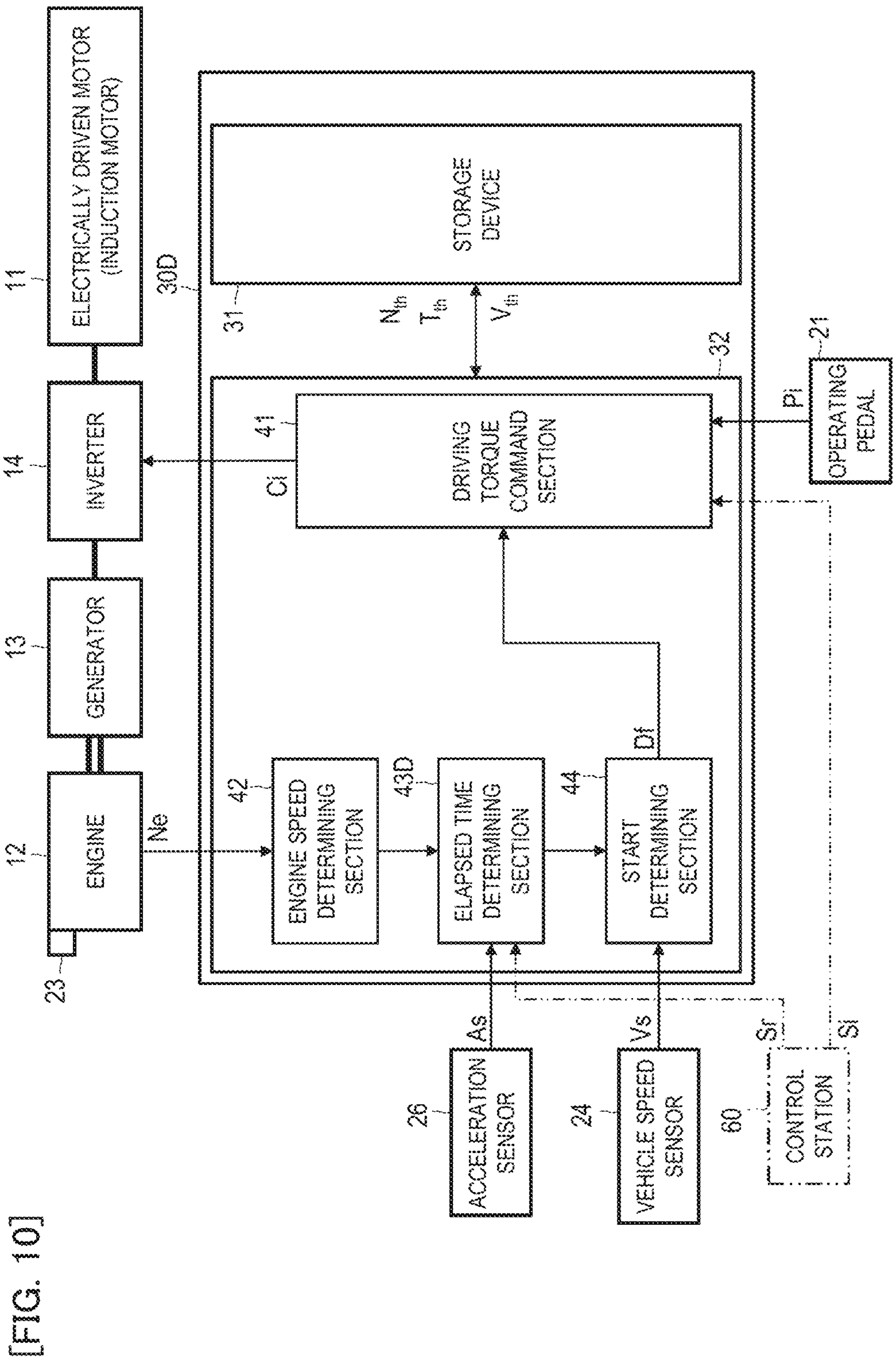
[FIG. 10]

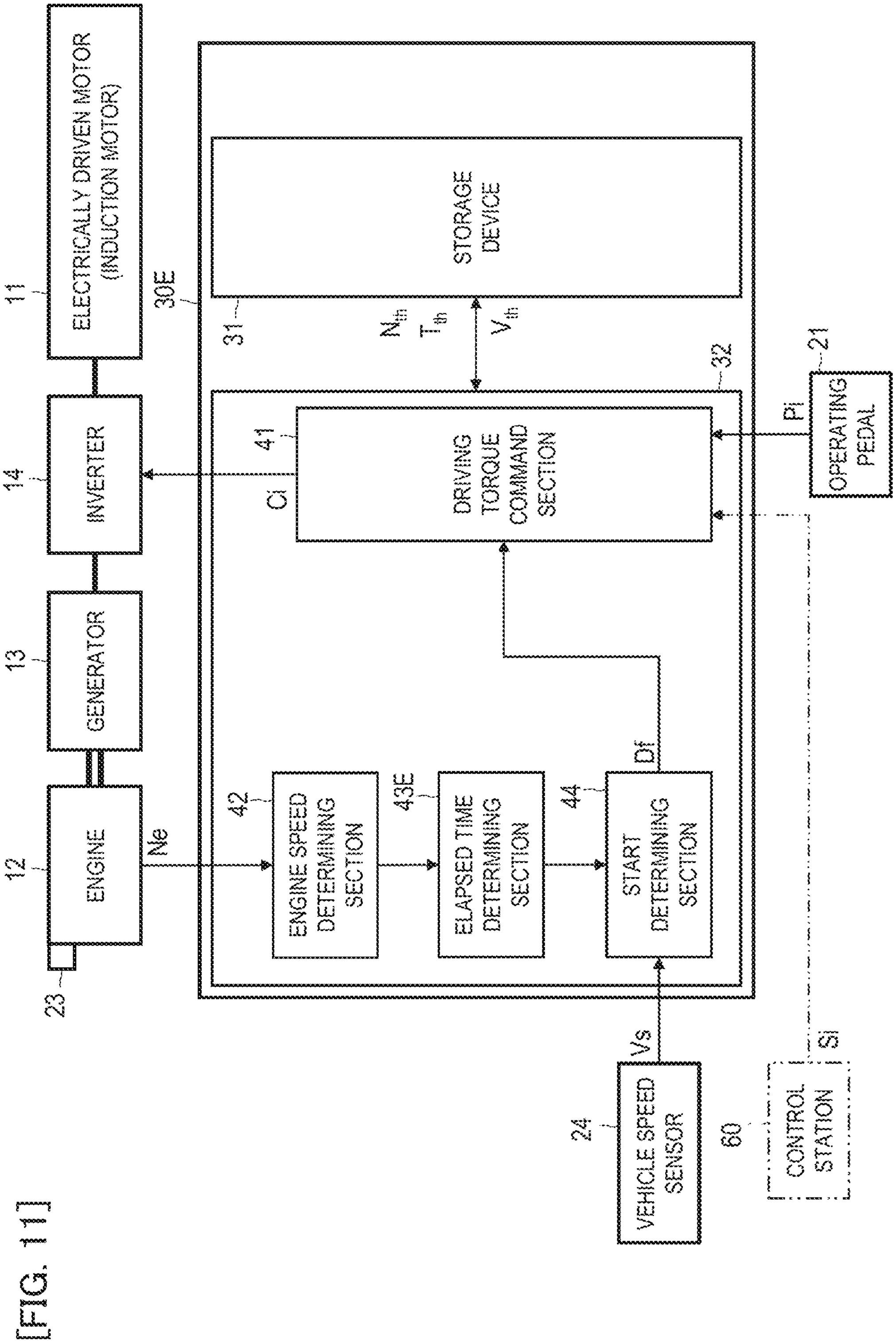
[FIG. 11]

[FIG. 12]
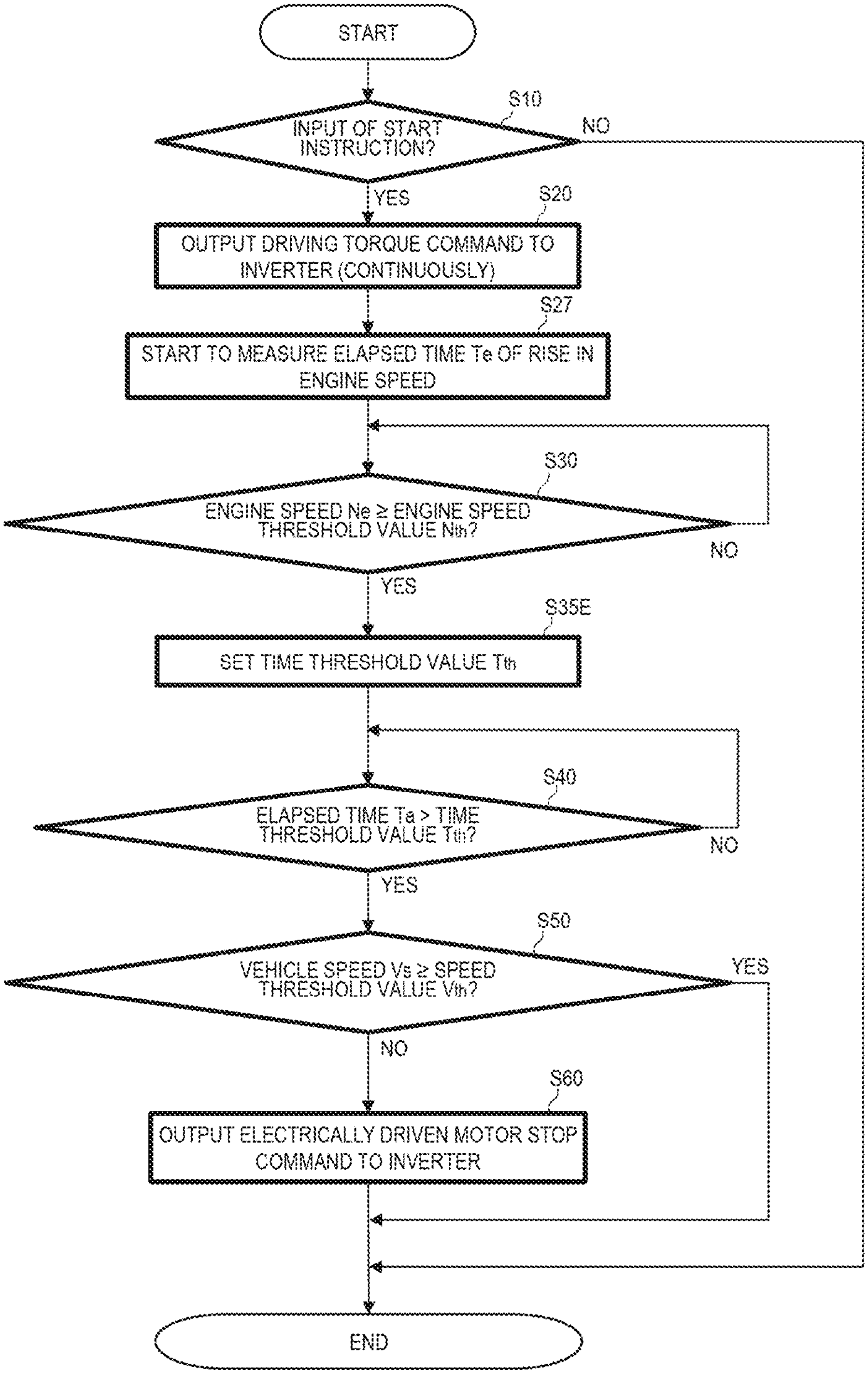

ELECTRICALLY DRIVEN HAULAGE VEHICLE

TECHNICAL FIELD

The present invention relates to a haulage vehicle such as a dump truck that transports ore or soil excavated at a mine or the like, and more particularly relates to an electrically driven haulage vehicle that travels by a driving force of an electrically driven motor driven by being supplied with electric power from a generator mechanically connected to an engine.

BACKGROUND ART

At a strip mine, a haulage vehicle such as a dump truck transports excavated ore or soil. The haulage vehicle generally has a transportation object loaded onto a bed thereof at a loading site at which a mineral is being excavated, travels on a transportation path in a state of being loaded with the transportation object, and discharges the transportation object at a dumping site (dumps soil). The haulage vehicle whose bed is emptied by discharging the transportation object returns to the loading site by travelling on the transportation path again and has a transportation object loaded onto the bed again. The haulage vehicle performs work of repeating such loading and dumping many times.

Methods by which the haulage vehicle dumps a transportation object at the dumping site include the following methods. First, the haulage vehicle travels backward to a target position while changing in position gradually on a large flat area, and directly dumps the transportation object onto the ground. Second, the haulage vehicle travels backward to immediately in front of a throwing opening referred to as a hopper or an edge of cliff, and dumps the transportation object into the hopper or off the cliff.

The use of the second method has an advantage of being able to perform the dumping from a more or less fixed place each time. However, there is a concern about the haulage vehicle falling into the hopper or off the cliff by going past the dumping position at the time of backward travelling to the dumping position. Accordingly, a vehicle stop formed by soil piling or the like is installed in front of the hopper or the cliff in order to prevent the falling of the vehicle. Even if the haulage vehicle is about to go past the dumping position, the travelling of the haulage vehicle is suppressed by travelling resistance of the vehicle stop.

The electrification of the haulage vehicle as described above has recently been underway with an objective of, for example, reducing maintenance cost by reducing mechanism parts of a transmission and the like. An electrically driven haulage vehicle generally generates electric power by a generator mechanically connected to an engine, supplies the generated electric power of the generator to an electrically driven motor fitted to rear wheels (driving wheels), and thereby travels with the electrically driven motor as a travelling driving source.

In the electrically driven haulage vehicle using the electrically driven motor as a travelling driving source, if the output of the electrically driven motor is continued even though the electrically driven haulage vehicle is in contact with the vehicle stop and is thus in a travelling impossible state, the energy of the electrically driven motor (travelling driving source) is wasted, and a load on a driving mechanism is increased, which leads to a decrease in energy efficiency. In addition, in a haulage vehicle of an autonomous travelling type that has recently started to be introduced at mines or the like, if the haulage vehicle continues to be in contact with the vehicle stop and thus in a travelling impossible state even though a start command has been output, there is a concern about falling into a deadlock in which the start command is not completed and it is not possible to proceed to a next command. For these reasons, it is preferable to determine whether or not the electrically driven haulage vehicle is in a travelling impossible state with the wheels in contact with the vehicle stop, and stop the travelling driving source of the vehicle when determining that the electrically driven haulage vehicle is in a travelling impossible state.

A technology described in Patent Document 1 has been proposed as a technology for determining whether or not the vehicle is in a travelling impossible state with the wheels of the vehicle in contact with the vehicle stop. A driving support device described in Patent Document 1 calculates a deviation degree between an acceleration in a front-rear direction of the vehicle which acceleration is estimated on the basis of a braking and driving force (resultant force of a braking force and a driving force) generated by a driving operation, the braking and driving force being sensed by a braking and driving force sensing section, and an acceleration in the front-rear direction of the vehicle sensed by an acceleration sensing section, and determines whether or not the vehicle is in contact with the vehicle stop on the basis of the calculated deviation degree. The driving support device is expected to be mounted in mass-produced vehicles such as automobiles, for example.

PRIOR ART DOCUMENT

Patent Document

Patent Document 1: JP-2012-116360-A

SUMMARY OF THE INVENTION

Problem to be Solved by the Invention

In a case where the technology described in Patent Document 1 is used to determine whether or not the vehicle is in contact with the vehicle stop at a time of a start of the vehicle, the braking and driving force generated by the driving operation needs to be sequentially sensed with high accuracy in order to estimate the acceleration of the own vehicle with high accuracy. In a case of an electric vehicle, the driving force in the braking and driving force generated by the driving operation is calculated on the basis of the value of output torque of the electrically driven motor. The output torque of the electrically driven motor therefore needs to be sensed with high accuracy.

Now, in a large-sized electrically driven haulage vehicle used at a mine, a large-sized electrically driven motor is desired as the travelling driving source, and therefore, an induction motor is generally used rather than a permanent magnet type synchronous motor used in an ordinary electric vehicle for riding. This is because the induction motor uses a winding field magnet and can thus be manufactured in a larger size than the permanent magnet type, and is able to deal with a harsh environment due to high resistance of the induction motor to vibration impacts and high temperatures, for example.

In the case of the induction motor, because of principles of generation of a rotational force thereof, it is difficult to sense the output torque of the motor at a time of a start of the vehicle with high accuracy. The induction motor generates torque (rotational force) by interaction between a rotating magnetic field generated by exciting a coil of a stator present on a casing side and an induced current generated in a coil of a rotor present on an output shaft side. The induced current is generated by a difference (slip) between the rotational speed of the rotating magnetic field and the rotational speed of the rotor. The output torque of the induction motor can be calculated by using a motor rotational speed sensed by a sensor. However, at a time of a start of the vehicle, the rotor of the induction motor is in a substantially stationary state, and thus the rotational speed is very low. It is therefore very difficult to measure the rotational speed of the induction motor (rotor) by the sensor with higher accuracy.

Thus, in the case where the induction motor is used as the travelling driving source of the vehicle, it is difficult to sense the output torque of the motor with high accuracy. Therefore, when the technology described in Patent Document 1 is used to determine whether or not the vehicle is in contact with the vehicle stop at a time of a start of the vehicle, it is difficult to estimate the acceleration of the own vehicle accurately, and consequently, a normal determination may not be able to be made.

The present invention has been made to solve the above-described problems. It is an object of the present invention to provide an electrically driven haulage vehicle that can reliably determine the presence or absence of a start impossible state of the vehicle caused by contact with a vehicle stop at a time of a start of the vehicle even when an induction motor is used as the travelling driving source of the vehicle.

Means for Solving the Problem

The present application includes a plurality of means for solving the above-described problems. To cite an example of the means, there is provided an electrically driven haulage vehicle including an engine, a generator that is mechanically driven by the engine, an electrically driven motor that is driven by electric power supplied from the generator, an engine speed sensor that senses a rotational speed of the engine, a speed sensor that senses a vehicle speed, and a controller that controls the driving of the electrically driven motor, the electrically driven haulage vehicle transporting a load by travelling by a driving force of the electrically driven motor. The controller includes an engine speed determining section configured to determine whether or not a sensed value of the engine speed sensor is equal to or higher than an engine speed threshold value when a vehicle start instruction is input, an elapsed time determining section configured to measure a first elapsed time from a time point at which the engine speed determining section determines that the sensed value of the engine speed sensor is equal to or higher than the engine speed threshold value, and determine whether or not the first elapsed time has reached a time threshold value, and a start determining section configured to determine whether or not a sensed value of the speed sensor is equal to or higher than a speed threshold value after the elapsed time determining section determines that the first elapsed time has reached the time threshold value. The controller is configured to stop the electrically driven motor when the start determining section determines that the sensed value of the speed sensor is lower than the speed threshold value.

Advantages of the Invention

According to the present invention, whether or not the vehicle speed has reached the speed threshold value is determined after the first elapsed time from the time point at which the engine speed reaches the engine speed threshold value reaches the time threshold value. It is thereby possible to determine whether or not the electrically driven haulage vehicle is in contact with the vehicle stop and is thus in a start impossible state with consideration given to an acceleration time from a start of movement of the vehicle at a time of a start to the reaching of a travelling state that can be sensed by the speed sensor. Thus, an error in the determination can be prevented. That is, it is possible to reliably determine the presence or absence of a start impossible state of the vehicle caused by contact with the vehicle stop at a time of a start of the vehicle.

Problems, configurations, and effects other than those described above will be made apparent by description of the following embodiments.

BRIEF DESCRIPTION OF THE DRAWINGS

FIG. 1 is an external view illustrating a dump truck as an electrically driven haulage vehicle according to a first embodiment of the present invention.

FIG. 2 is a block diagram illustrating a general configuration of an electrically driven travelling system in the electrically driven haulage vehicle according to the first embodiment and a controller that controls the electrically driven travelling system.

FIG. 3 is a flowchart illustrating an example of a control procedure of the controller of the electrically driven haulage vehicle according to the first embodiment illustrated in FIG. 2.

FIG. 4 is a timing diagram illustrating an example of temporal transitions of an engine speed and a vehicle speed at a time of a start of the electrically driven haulage vehicle according to the first embodiment.

FIG. 5 is a block diagram illustrating a general configuration of an electrically driven travelling system in an electrically driven haulage vehicle according to a second embodiment of the present invention and a controller that controls the electrically driven travelling system.

FIG. 6 is a flowchart illustrating an example of a control procedure of the controller of the electrically driven haulage vehicle according to the second embodiment illustrated in FIG. 5.

FIG. 7 is a block diagram illustrating a general configuration of an electrically driven travelling system in an electrically driven haulage vehicle according to a modification of the second embodiment and a controller that controls the electrically driven travelling system.

FIG. 8 is a block diagram illustrating a general configuration of an electrically driven travelling system in an electrically driven haulage vehicle according to a third embodiment of the present invention and a controller that controls the electrically driven travelling system.

FIG. 9 is a flowchart illustrating an example of a control procedure of the controller of the electrically driven haulage vehicle according to the third embodiment illustrated in FIG. 8.

FIG. 10 is a block diagram illustrating a general configuration of an electrically driven travelling system in an electrically driven haulage vehicle according to a first modification of the third embodiment and a controller that controls the electrically driven travelling system.

FIG. 11 is a block diagram illustrating a general configuration of an electrically driven travelling system in an electrically driven haulage vehicle according to a second modification of the third embodiment and a controller that controls the electrically driven travelling system.

FIG. 12 is a flowchart illustrating an example of a control procedure of the controller of the electrically driven haulage vehicle according to the second modification of the third embodiment illustrated in FIG. 11.

MODES FOR CARRYING OUT THE INVENTION

In the following, embodiments of an electrically driven haulage vehicle according to the present invention will be described with reference to the drawings. In the present embodiments, the description will be made by taking a dump truck as an example of the electrically driven haulage vehicle. Incidentally, forward, rearward, left, and right directions described in the present specification represent directions as viewed from an operator aboard the electrically driven haulage vehicle.

First Embodiment

A general configuration of a dump truck as an electrically driven haulage vehicle according to a first embodiment of the present invention will first be described with reference to FIG. 1. FIG. 1 is an external view illustrating the dump truck as the electrically driven haulage vehicle according to the first embodiment.

In FIG. 1, the dump truck 1 as an electrically driven haulage vehicle transports a load W such as ore or soil mined in a mine, and travels by a driving force of an electrically driven motor 11 to be described later. The dump truck 1 includes a machine body frame 2 as a supporting structure that extends in a forward-rearward direction (left-right direction in FIG. 1), front wheels 3 and rear wheels 4 as wheels rotatably provided to both the left side and the right side of a front portion and a rear portion of the machine body frame 2, a cabin 5 installed on the front portion of the machine body frame 2, and a bed 6 mounted on the machine body frame 2 to be able to be raised and lowered (tilted). The front portion of the machine body frame 2 is mounted with an engine 12, a generator 13, and an inverter 14 (see FIG. 2 to be described later) for supplying electric power to the electrically driven motor 11 and the like.

The front wheels 3 are, for example, steered wheels steered by the operator. The rear wheels 4 are driving wheels rotationally driven by the electrically driven motor 11. A front suspension 7 that alleviates an impact on the machine body frame 2 by absorbing vibration received from a road surface during travelling is provided between the front portion of the machine body frame 2 and the front wheels 3. A rear suspension 8 that alleviates an impact on the machine body frame 2 by absorbing vibration received from the road surface during travelling is provided between the rear portion of the machine body frame 2 and the rear wheels 4. The front suspension 7 and the rear suspension 8, for example, include a suspension cylinder filled with compressible oil, and have a mechanism that uses the compression of the oil by a piston as a spring.

The cabin 5 is a part that the operator boards to operate the vehicle. In the cabin 5, a cab seat (not illustrated) in which the operator is to be seated and various kinds of operating equipment for the operator to operate the dump truck 1 are arranged, the various kinds of operating equipment being an operating pedal 21 (see FIG. 2 to be described later) for making the dump truck 1 travel, a steering wheel (not illustrated) for steering the front wheels 3, an operating unit (not illustrated) for operating the raising and lowering of the bed 6, and the like.

The bed 6 is to be loaded with the load W. A rear end portion of the bed 6 is rotatably attached to a rear end portion of the machine body frame 2 via a rotating pin 2*a*. A hoist cylinder 9 that raises and lowers the bed 6 is provided between the machine body frame 2 and the bed 6. The bed 6 is configured to be tilted by expansion and contraction of the hoist cylinder 9 with respect to the machine body frame 2 between a transportation rotational position (solid line) as a position for loading the load W onto the bed 6 and transporting the load W and a dumping rotational position (chain double-dashed line) as a position for dumping the load W from the bed 6.

The dump truck 1 has an engine speed sensor 23 for sensing a rotational speed of the engine 12 (see FIG. 2 to be described later), a vehicle speed sensor 24 for sensing a vehicle speed (speed of the dump truck 1), an acceleration sensor for sensing a vehicle acceleration (acceleration of the dump truck 1), and load sensors 25 for sensing a loading weight of the load W. The vehicle speed sensor 24 is, for example, a speed sensor for sensing the rotational speed of the rear wheels 4. The load sensors 25 are, for example, pressure sensors for sensing pressures within the suspension cylinders of the front suspension 7 and the rear suspension 8. For the load sensors, other than the pressure sensors, a configuration can also be adopted which uses a sensor capable of sensing forces acting on the front suspension 7 and the rear suspension 8. In addition, the load sensors can be configured to be a weight sensor that is installed in a seating part of the bed 6.

At a loading site, the dump truck 1 having such a configuration has soil or the like as the load W (transportation object) loaded onto the bed 6 by a loading machine such as an excavator or a wheel loader. The dump truck 1 having the transportation object W loaded on the bed 6 travels on a transportation path when the rear wheels 4 are rotationally driven by the driving force of the electrically driven motor 11. At a dumping site, when the hoist cylinder 9 is expanded by an operation of the operator, the dump truck 1 tilts the bed 6 from the transportation rotational position (solid line in FIG. 1) to the dumping rotational position (chain double-dashed line in FIG. 1), and discharges the transportation object W loaded on the bed 6 from a rear end of the bed 6 (dumps the soil). The dump truck 1 after emptying the bed 6 by discharging the transportation object W starts from the dumping site, travels on the transportation path, and returns to the loading site. The dump truck 1 repeats many times loading at the loading site, travelling from the loading site to the dumping site or from the dumping site to the loading site, and dumping at the dumping site.

The dump truck 1, for example, backs to immediately in front of a throwing opening referred to as a hopper or an edge of a cliff (both are not illustrated) at the dumping site, then stops, and dumps the transportation object W on the bed 6 into the hopper or off the cliff. In this case, at the dumping site, in order to prevent the dump truck 1 from going past a travelling stop position at the time of the backing, a vehicle stop 100 formed by piling soil or the like is installed in front of the hopper or the cliff. When the dump truck 1 is about to go past the travelling stop position, the travelling of the dump truck 1 is regulated by travelling resistance of the vehicle stop 100.

With reference to FIG. 2, description will next be made of a general configuration of an electrically driven travelling system in the electrically driven haulage vehicle according to the first embodiment and hardware and functions of a controller that controls the electrically driven travelling system. FIG. 2 is a block diagram illustrating a general configuration of the electrically driven travelling system in the electrically driven haulage vehicle according to the first embodiment illustrated in FIG. 1 and the controller that controls the electrically driven travelling system.

The electrically driven travelling system of the dump truck 1 includes the electrically driven motor 11 that rotationally drives the rear wheels 4 (wheels), the generator 13 that supplies electric power to the electrically driven motor 11, the engine 12 that drives the generator 13, and the inverter 14 that adjusts the electric power supplied from the generator 13 to the electrically driven motor 11. The electrically driven motor 11 is constituted by an induction motor. The generator 13 is mechanically connected to the engine 12, and generates the electric power by being driven by the engine 12. The engine 12 is configured to raise the rotational speed thereof at a time of a start of the vehicle and at a time of an accelerating operation. The engine 12 has an engine control section (not illustrated) that controls the engine speed according to a command from a controller 30 to be described later. The engine 12 is provided with the above-described engine speed sensor 23 that senses the rotational speed of the engine 12. The engine 12 (engine control section) outputs a sensed value of the engine speed sensor 23 (engine speed Ne) to the controller 30 to be described later. The inverter 14 controls the torque and rotational speed of the electrically driven motor 11 according to a command from the controller 30 to be described later. In the case of the electrically driven travelling system, mechanical elements such as transmission gears constituting a mechanical travelling driving system are not necessary, and therefore, it is possible to reduce the maintenance cost of the maintenance of lubricating oil, the overhauling of equipment, and the like.

The controller 30 controls the electrically driven travelling system of the dump truck 1 on the basis of an operation signal Pi input from the operating pedal 21, information input from the engine 12 (engine control section) (engine speed Ne or the like), and the like. The controller 30 is configured to control the driving of the engine 12 of the electrically driven travelling system via the engine control section, and control the driving of the electrically driven motor 11 of the electrically driven travelling system via the inverter 14. In addition, in a case where the dump truck 1 is of an autonomous travelling type that travels without depending on the operation of the operator aboard the cabin 5 (see FIG. 1), the controller 30 is configured to be able to control the electrically driven travelling system of the dump truck 1 according to an autonomous travelling instruction Si from a control station 60.

Assumed here is a case in which the dump truck 1 is in contact with the vehicle stop 100 (see FIG. 1) and is thus set in a start impossible state at a "time of a start." If the driving force of the electrically driven motor 11 continues to be output in spite of the start impossible state, the electric power (energy) supplied to the electrically driven motor 11 is wasted, thereby decreasing energy efficiency. In addition, in the case where the dump truck 1 is of the autonomous travelling type, if the start impossible state is continued with the dump truck 1 in contact with the vehicle stop 100 even though a start instruction is output from the control station 60, there is a concern about falling into a deadlock in which the start instruction is not completed and it is not possible to proceed to a next command.

Accordingly, the controller 30 of the dump truck 1 according to the present embodiment is configured to determine whether or not the dump truck 1 is in a travelling impossible state with the front wheels 3 or the rear wheels 4 (wheels) in contact with the vehicle stop 100 at a time of a start, and perform control of stopping the electrically driven motor 11 when determining that the dump truck 1 is in a start impossible state. The electric power (energy) supplied to the electrically driven motor 11 is thereby prevented from being wasted. In addition, in the case where the dump truck 1 is of the autonomous travelling type, falling into a deadlock in response to the start instruction is prevented.

Specifically, the controller 30 includes, as a hardware configuration, for example, a storage device 31 constituted by a RAM, a ROM, and the like and a computation processing device 32 constituted by a CPU, an MPU, and the like including a timer capable of measuring time. The storage device 31 stores, in advance, a program and various kinds of information necessary to control the electrically driven travelling system at a time of a start of the dump truck 1. The computation processing device 32 implements various kinds of functions including the following functions by reading the program and the various kinds of information from the storage device 31 as appropriate and performing processing according to the program. The controller 30 has a driving torque command section 41, an engine speed determining section 42, an elapsed time determining section 43, and a start determining section 44 as functions performed by the computation processing device 32 at a time of a start of the dump truck 1.

The driving torque command section 41 captures the operation signal Pi corresponding to an operation amount of the operating pedal 21 or the autonomous travelling instruction Si (an accelerating instruction, a decelerating instruction, or the like) from the control station 60, and computes a command value of driving torque to be applied to the wheels (rear wheels 4) by the electrically driven motor (induction motor) 11 on the basis of the captured operation signal Pi or the captured autonomous travelling instruction Si. Basically, a command value Ci of a current supplied to the electrically driven motor (induction motor) 11 which command value corresponds to the command value of the driving torque as a computation result is output to the inverter 14. The controller 30 thereby controls the driving of the electrically driven motor (induction motor) 11 (travelling of the vehicle) via the inverter 14. However, when a start impossible determination result to be described later is input from the start determining section 44, a command indicating a supply current value of "0," which command is a command to stop the electrically driven motor 11, is output instead of a command of the supply current value computed on the basis of the operation signal Pi of the operating pedal 21 or the autonomous travelling instruction Si from the control station 60. Incidentally, such a command as to gradually decrease the supply current value (driving torque) and ultimately set the supply current value to "0" is also possible as the stop command for the electrically driven motor 11.

The induction motor 11 can output forward travelling or backward travelling torque according to the rotational direction (positive rotation or reverse rotation) of a rotating magnetic field. In addition, the induction motor 11 can output torque that accelerates the vehicle or torque that decelerates the vehicle by regenerative braking, according to the magnitude relation of the rotational speed of the rotating magnetic field to the rotational speed of the wheels (rear wheels 4). In addition, the operating pedal 21 is constituted by, for example, two pedals, that is, an accelerator pedal for performing an accelerating operation and a retard pedal for performing a decelerating operation. The direction of the output torque of the induction motor 11 can be switched by operating the accelerator pedal or the retard pedal.

The driving torque command section 41 can therefore express command values corresponding to all of forward and rearward movements, acceleration, and deceleration of the vehicle by assigning a positive or negative sign to the driving torque command value as a computation result according to the application direction of the output torque of the induction motor 11. For example, the sign of the driving torque command value is set to be positive for acceleration and negative for braking at a time of forward traveling, and is conversely set to be positive for braking and negative for acceleration at a time of backward travelling. When the vehicle travels backward to approach the dumping position, for example, the driving torque command section 41 increases the driving torque command value in a negative direction as an operation amount of the accelerator pedal constituting the operating pedal 21 is increased. On the other hand, the driving torque command section 41 increases the driving torque command value in a positive direction as an operation amount of the retard pedal constituting the operating pedal 21 is increased.

The engine speed determining section 42 monitors the engine speed and determines whether or not the engine speed is equal to or higher than an engine speed threshold value Nth when a start of a vehicle starting operation is input. Specifically, the engine speed determining section 42 captures the engine speed Ne as the sensed value of the engine speed sensor 23 output from the engine control section of the engine 12, and determines whether or not the engine speed Ne is equal to or higher than the engine speed threshold value Nth. The engine speed threshold value Nth is an index for determining that the generator 13 is in a state of being able to supply the electrically driven motor 11 with necessary and sufficient electric power to start the dump truck 1.

In the case of a large-sized electrically driven haulage vehicle such as one for mines, the engine 12 is also large, and therefore, it takes a certain length of time to raise the engine speed at a time of a start. Moreover, the torque of the engine 12 is not only used to raise the rotational speed of the engine 12 itself but also used to drive the generator 13. Therefore, depending on conditions of a starting load on the electrically driven haulage vehicle, it may take an even longer time to raise the engine speed. For this reason, an elapsed time from a start of a starting operation cannot be used as an index for determining whether or not the generator 13 is in a state of being able to supply necessary and sufficient electric power to start the vehicle.

Accordingly, the controller 30 uses the engine speed Ne as an index of the electric power generated by the generator 13. The electric power generated by the generator 13 driven by the engine 12 increases as the rotational speed of the engine 12 increases. It can therefore be considered that the generator 13 is in a state of being able to generate necessary and sufficient electric power to start the dump truck 1 when the engine speed Ne is equal to or higher than the engine speed threshold value Nth. The engine speed threshold value Nth is, for example, stored in the storage device 31 in advance.

When the engine speed determining section 42 determines that the engine speed Ne as the sensed value of the engine speed sensor 23 is equal to or higher than the engine speed threshold value Nth, the elapsed time determining section 43 measures an elapsed time Ta from a time point of the determination of the engine speed determining section 42 and determines whether or not the measured elapsed time Ta has reached a time threshold value Tth. The time threshold value Tth is an index for determining whether or not a time for acceleration until a travelling state is reached from a start of movement of the dump truck 1 has elapsed. The time threshold value Tth is, for example, stored in the storage device 31 in advance.

The start determining section 44 determines whether or not the dump truck 1 has started, when the elapsed time determining section 43 determines that the measured elapsed time Ta has reached the time threshold value Tth. Specifically, when the elapsed time determining section 43 determines that the elapsed time Ta has reached the time threshold value Tth, the start determining section 44 captures a vehicle speed Vs as a sensed value of the vehicle speed sensor 24 and determines whether or not the vehicle speed Vs is equal to or higher than a speed threshold value Vth. When determining that the vehicle speed Vs is lower than the speed threshold value Vth, the start determining section 44 assumes that the dump truck 1 cannot start with the front wheels 3 or the rear wheels 4 in contact with the vehicle stop 100 at a time of a start. The start determining section 44 then outputs a start impossible determination result Df to the driving torque command section 41.

The speed threshold value Vth is set to be a speed that can be reliably sensed by the vehicle speed sensor 24 and at which it can be reliably confirmed that the dump truck 1 is in a travelling state without being in contact with the vehicle stop 100. When the dump truck 1 is in a start impossible state with the front wheels 3 or the rear wheels 4 in contact with the vehicle stop 100 at a time of a start, the vehicle speed Vs does not reach the speed threshold value Vth. When the front wheels 3 or the rear wheels 4 are not in contact with the vehicle stop 100 at a time of a start, on the other hand, the vehicle speed Vs rises and reaches the speed threshold value Vth after the time threshold value Tth passes from a state in which the dump truck 1 can start. Hence, the presence or absence of a start of the dump truck 1 can be determined on the basis of whether or not the vehicle speed Vs has reached the speed threshold value Vth. The speed threshold value Vth can be set to be a fixed value stored in the storage device 31 in advance. In addition, the speed threshold value Vth can also be set to be changed according to an operation amount of a starting operation of the operating pedal 21, a target speed of a start instruction from the control station 60, or the like.

A vehicle start control procedure of the controller of the electrically driven haulage vehicle according to the first embodiment will next be described with reference to FIG. 3. FIG. 3 is a flowchart illustrating an example of the vehicle start control procedure of the controller of the electrically driven haulage vehicle according to the first embodiment illustrated in FIG. 2.

In FIG. 3, the controller 30 illustrated in FIG. 2 determines whether or not there is an input of a start instruction for the dump truck 1 (step S10). When determining that a start instruction for the dump truck 1 is input, the controller 30 proceeds to step S20. When determining otherwise, on the other hand, the controller 30 ends the control flow. For example, the controller 30 determines that a start instruction for the dump truck 1 is input, when the sensed value Vs of the vehicle speed sensor 24 is 0 and an operation signal indicating an accelerating instruction of the operating pedal 21 (operation signal of the accelerator pedal) or an accelerating instruction from the control station 60 is input. Otherwise, the controller 30 determines that the start instruction is not input.

When the controller 30 makes a determination of YES (input of the start instruction) in step S10, the driving torque command section 41 of the controller 30 outputs, to the inverter 14, a driving torque command value for the electrically driven motor 11 computed on the basis of the accelerating instruction from the operating pedal 21 or the control station 60 (step S20). Specifically, the driving torque command section 41 computes the driving torque command value for the electrically driven motor 11 on the basis of the accelerating instruction from the operating pedal 21 or the control station 60, converts the driving torque command value as a result of the computation into a supply current command value Ci, which is the value of a current to be supplied from the generator 13 to the electrically driven motor 11, and outputs the supply current command value Ci to the inverter 14. The inverter 14 thereby supplies the electric power generated by the generator 13 driven by the engine 12 to the electrically driven motor 11 according to the supply current command value (driving torque command value). Incidentally, the output of the driving torque command value to the inverter 14 by the controller 30 is continued while steps subsequent to step S20 are performed.

Next, the controller 30 determines whether or not the engine speed Ne sensed by the engine speed sensor 23 is equal to or higher than the engine speed threshold value Nth (step S30). Specifically, the engine speed determining section 42 makes the determination by comparing the engine speed Ne sensed by the engine speed sensor 23 with the engine speed threshold value Nth stored in the storage device 31 in advance. When the engine speed Ne is lower than the engine speed threshold value Nth (in a case of NO), the controller 30 returns to step S30. The controller 30 repeats the above-described determination in step S30 until the engine speed Ne becomes equal to or higher than the engine speed threshold value Nth (YES).

In a case of YES in step S30, the controller 30 starts to measure the elapsed time Ta from the time point at which the engine speed determining section 42 determines that the engine speed Ne is equal to or higher than the engine speed threshold value Nth (YES), and determines whether or not the measured elapsed time Ta has exceeded the time threshold value Tth (step S40). Specifically, the elapsed time determining section 43 makes the determination by comparing the measured elapsed time Ta with the time threshold value Tth stored in the storage device 31 in advance. When the elapsed time Ta has not exceeded the time threshold value Tth (in a case of NO), the controller 30 returns to step S40 and repeats the determination in step S40 until the elapsed time Ta exceeds the time threshold value Tth (YES is obtained).

In a case of YES in step S40, the controller 30 determines whether or not the vehicle speed Vs sensed by the vehicle speed sensor 24 is equal to or higher than the speed threshold value Vth (step S50). Specifically, the start determining section 44 makes the determination by comparing the vehicle speed Vs sensed by the vehicle speed sensor 24 with the speed threshold value Vth stored in the storage device 31 in advance. When the vehicle speed Vs is higher than the speed threshold value Vth (in a case of YES), the controller 30 determines that the start is completed. The controller 30 then ends the control flow. When the vehicle speed Vs is lower than the speed threshold value Vth (in a case of NO), on the other hand, the controller 30 proceeds to step S60.

In a case of NO in step S50, that is, when the vehicle speed Vs is lower than the speed threshold value Vth, the driving torque command section 41 outputs a stop command to stop the electrically driven motor 11 to the inverter 14 (step S60). Specifically, the start determining section 44 outputs a determination result Df of "NO" in step S50 as a start impossible determination result to the driving torque command section 41. According to an input of the start impossible determination result Df, the driving torque command section 41 changes the driving torque command value from the computed value corresponding to the accelerating instruction from the operating pedal 21 or the control station 60 in step S20 to "0" as the stop command.

The series of processing steps described above first determine, when a vehicle start instruction is input, whether the generator 13 has reached a state of being able to supply necessary and sufficient electric power for the electrically driven motor 11 to be able to output a travelling driving force for a vehicle start, and next determine whether or not the vehicle has reached a travelling state at a speed that can be sensed by the vehicle speed sensor 24 by accelerating after starting to move. These determinations make it possible to reliably determine, without sensing the driving torque of the induction motor 11, whether the dump truck 1 has started without coming into contact with the vehicle stop 100 or whether the dump truck 1 is in contact with the vehicle stop 100 and is thus unable to start.

Operation of the electrically driven haulage vehicle according to the first embodiment will next be described with reference to FIGS. 2 to 4. FIG. 4 is a timing diagram illustrating an example of temporal transitions of the engine speed and the vehicle speed at a time of a start of the electrically driven haulage vehicle according to the first embodiment.

In FIG. 4, an upper diagram illustrates temporal transitions of an operation amount of the accelerator pedal as a start instruction of the operating pedal 21. A middle diagram illustrates temporal transitions of the engine speed Ne in response to the start instruction of the operating pedal 21 illustrated in the upper diagram. A lower diagram illustrates temporal transitions of the vehicle speed Vs in response to the start instruction of the operating pedal 21 illustrated in the upper diagram.

Description will be made of a case where a start instruction of the operating pedal 21 is input at time T1, as illustrated in the upper diagram of FIG. 4. In response to the start instruction of the operating pedal 21, the controller 30 illustrated in FIG. 2 raises the engine speed Ne from an idle engine speed Ni to a target engine speed corresponding to the operation amount of the operating pedal 21 via the engine control section of the engine 12. However, the torque of the engine 12 is not only used to raise the rotational speed of the engine 12 itself but also used to drive the generator 13. It therefore takes a certain length of time for the engine speed Ne to rise from the idle engine speed Ni to the target engine speed. Thus, as illustrated in the middle diagram of FIG. 4, the engine speed Ne gradually rises from the idle engine speed Ni at time T1 and ultimately reaches the target engine speed.

When the start instruction of the operating pedal 21 is input at time T1, the controller 30 in the present embodiment determines whether or not the engine speed Ne is equal to or higher than the engine speed threshold value Nth (step S30 illustrated in FIG. 3). In a period of short elapsed time from time T1, as illustrated in the middle diagram of FIG. 4, the engine speed Ne does not reach the engine speed threshold value Nth.

When the engine speed Ne reaches the engine speed threshold value Nth at time T2, the controller 30 determines that the engine speed Ne is equal to or higher than the engine speed threshold value Nth, and measures the elapsed time Ta from the time point of the determination (that is, time T2) (step S40 illustrated in FIG. 3). When the measured elapsed time Ta exceeds the time threshold value Tth, that is, when the measured elapsed time Ta reaches time T3 (T3−T2=Tth) in the lower diagram of FIG. 4, the controller 30 determines whether or not the vehicle speed Vs ($V_{T3}$) at the time T3 when the time threshold value Tth is exceeded exceeds the speed threshold value Vth (step S50 illustrated in FIG. 3).

In addition, when the start instruction is input at time T1, the controller 30 outputs, to the inverter 14, a driving torque command for the electrically driven motor 11 which driving torque command is computed on the basis of the operation amount of the operating pedal 21 (step S20 illustrated in FIG. 3). The electric power generated by the generator 13 driven by the engine 12 is thereby supplied to the electrically driven motor 11 via the inverter 14. The electrically driven motor 11 tries to rotationally drive the rear wheels 4 by the driving torque of the electrically driven motor 11. However, in a period of short elapsed time from time T1, as illustrated in the middle diagram of FIG. 4, the engine speed Ne is not high, and therefore, the electric power generated by the generator 13 does not reach a level of being able to rotationally drive the rear wheels 4. Therefore, as illustrated in the lower diagram of FIG. 4, the travelling speed (vehicle speed Vs) of the dump truck 1 remains in a stop state (speed 0) for some time from time T1. Thereafter, the engine speed Ne gradually rises according to the passage of time from time T1, and consequently, the electric power generated by the generator 13 reaches a level of being able to rotationally drive the rear wheels 4. The dump truck 1 thereby starts to move.

At this time, when the front wheels 3 or the rear wheels 4 of the dump truck 1 are not in contact with the vehicle stop 100, the dump truck 1 that has started to move is accelerated by the driving torque of the electrically driven motor 11. Thus, the vehicle speed Vs rises gradually. In the lower diagram of FIG. 4, the vehicle speed Vs reaches $V_{T3}$ at time T3. In this case, the controller 30 determines that the vehicle speed Vs ($V_{T3}$) at time T3 is equal to or higher than the speed threshold value Vth (YES in step S50 illustrated in FIG. 3). In this case, the output of the driving torque command to the inverter 14 according to the operation amount of the operating pedal 21 is continued.

When the front wheels 3 or the rear wheels 4 of the dump truck 1 are in contact with the vehicle stop 100, on the other hand, the dump truck 1 is set in a start impossible state by the vehicle stop 100. Therefore, even after a time has passed from time T1, the vehicle speed Vs of the dump truck 1 is "0," which represents the start impossible state, or a speed in the vicinity thereof. That is, at time T3, the vehicle speed Vs is "0" or a speed in the vicinity thereof. In this case, the controller 30 determines that the vehicle speed Vs ($V_{T3}$) at time T3 is lower than the speed threshold value Vth (NO in step S50 illustrated in FIG. 3). In this case, the controller 30 outputs a command indicating driving torque of "0" as a stop command for the electrically driven motor 11 to the inverter 14 regardless of the operation amount of the operating pedal 21.

Thus, in the present embodiment, the controller 30 determines whether or not the vehicle speed Vs when the elapsed time Ta from a time point at which the engine speed Ne is judged to be equal to or higher than the engine speed threshold value Nth exceeds the time threshold value Tth is equal to or higher than the speed threshold value Vth. The time threshold value Tth is provided by taking into consideration an acceleration time from a start of movement of the dump truck 1 to the reaching of a travelling state. When the dump truck 1 is in a start impossible state with the front wheels 3 or the rear wheels 4 in contact with the vehicle stop 100, the vehicle speed Vs does not exceed the speed threshold value Vth. When the dump truck 1 starts without being in contact with the vehicle stop 100, on the other hand, the dump truck 1 is in a travelling state in which the vehicle speed Vs exceeds the speed threshold value Vth, after the passage of the time threshold value Tth. Hence, the controller 30 can determine whether or not the dump truck 1 is in contact with the vehicle stop 100 and is thus in a start impossible state by the above-described determination without sensing the driving torque of the electrically driven motor 11.

Further, in the present embodiment, the controller 30 is configured to stop the electrically driven motor 11 when determining that the vehicle speed Vs when the elapsed time Ta exceeds the time threshold value Tth does not exceed the speed threshold value Vth. Thus, the continuation of output of the electrically driven motor 11 is inhibited at a time of a start impossible state caused by contact with the vehicle stop 100. It is therefore possible to suppress wasting of the energy of the electrically driven motor 11. In addition, it is possible to prevent falling into a deadlock in which the start instruction is not completed and it is not possible to proceed to a next command, when the vehicle is in contact with the vehicle stop 100 and is thus in a start impossible state during autonomous travelling.

As described above, the dump truck 1 (electrically driven haulage vehicle) according to the first embodiment includes the engine 12, the generator 13 mechanically driven by the engine 12, the electrically driven motor 11 driven by the electric power supplied from the generator 13, the engine speed sensor 23 that senses the engine speed Ne of the engine 12, the vehicle speed sensor 24 (speed sensor) that senses the vehicle speed Vs, and the controller 30 that controls driving of the electrically driven motor 11, the dump truck 1 (electrically driven haulage vehicle) transporting the load W by travelling by the driving force of the electrically driven motor 11. The controller 30 includes the engine speed determining section 42 that determines whether or not the value Ne sensed by the engine speed sensor 23 is equal to or higher than the engine speed threshold value Nth when a vehicle start instruction is input, the elapsed time determining section 43 that measures the elapsed time Ta (first elapsed time) from a time point at which the engine speed determining section 42 determines that the value Ne sensed by the engine speed sensor 23 is equal to or higher than the engine speed threshold value Nth, and determines whether or not the elapsed time Ta (first elapsed time) has reached the time threshold value Tth, and the start determining section 44 that determines whether or not the value Vs sensed by the vehicle speed sensor 24 (speed sensor) is equal to or higher than the speed threshold value Vth after the elapsed time determining section 43 determines that the elapsed time Ta (first elapsed time) has reached the time threshold value Tth, and the controller 30 is configured to stop the electrically driven motor 11 when the start determining section 44 determines that the value Vs sensed by the vehicle speed sensor 24 (speed sensor) is lower than the speed threshold value Vth.

According to this configuration, whether or not the vehicle speed Vs has reached the speed threshold value Vth is determined after the elapsed time Ta (first elapsed time) from the time point at which the engine speed Ne reaches the engine speed threshold value Nth reaches the time threshold value Tth. It is thereby possible to determine whether or not the dump truck 1 (electrically driven haulage vehicle) is in contact with the vehicle stop 100 and is thus in a start impossible state with consideration given to the acceleration time from a start of movement of the dump truck 1 (electrically driven haulage vehicle) at a time of a start to the reaching of a travelling state that can be sensed by the vehicle speed sensor 24 (speed sensor). Thus, an error in the determination can be prevented. That is, it is possible to reliably determine the presence or absence of a start impossible state of the dump truck 1 (electrically driven haulage vehicle) caused by contact with the vehicle stop 100 at a time of a start of the vehicle.

Second Embodiment

An electrically driven haulage vehicle according to a second embodiment of the present invention will next be described with reference to FIG. 5 and FIG. 6. Incidentally, in FIG. 5 and FIG. 6, reference numerals same as the reference numerals illustrated in FIGS. 1 to 4 represent similar parts, and therefore, detailed description thereof will be omitted. FIG. 5 is a block diagram illustrating a general configuration of an electrically driven travelling system in the electrically driven haulage vehicle according to the second embodiment and a controller that controls the electrically driven travelling system.

The electrically driven haulage vehicle according to the second embodiment illustrated in FIG. 5 is different from that of the first embodiment in the following respects. The controller 30 according to the first embodiment is configured such that the engine speed determining section 42 makes a determination by using the engine speed threshold value Nth, which is a predetermined value set in advance. On the other hand, a controller 30A according to the second embodiment is configured such that an engine speed determining section 42A changes the setting of the engine speed threshold value Nth as a determination index according to the loading weight of the load W on the dump truck 1.

A total weight of the dump truck 1 changes significantly according to the presence or absence of the load W. As the total weight of the dump truck 1 increases, the electric power generated by the generator 13 which electric power is necessary to start the dump truck 1 also increases. The engine speed threshold value Nth as a determination index of the engine speed determining section 42A is used as an index of whether or not the electric power generated by the generator 13 has reached electric power necessary to start the dump truck 1. It is therefore preferable to change the engine speed threshold value Nth according to a change in the total weight of the dump truck 1 (loading weight of the load W) instead of making the engine speed threshold value Nth a fixed value.

Specifically, the engine speed determining section 42A captures cylinder pressures Ps of the suspensions 7 and 8 as the sensed values of the pressure sensors 25 functioning as a load sensor for sensing the loading weight of the load W, and calculates the total weight of the dump truck 1 including the weight of the load W on the basis of the pressures Ps sensed by the pressure sensors 25. Electric power (energy) necessary to start the dump truck 1 is computed on the basis of the total weight of the dump truck 1 as a calculation result, and the engine speed threshold value Nth is set according to the magnitude of the electric power (energy) as a computation result. That is, the engine speed determining section 42A sets the engine speed threshold value Nth to rise as the loading weight of the load W is increased. Incidentally, in the controller 30A according to the present embodiment, the respective functional sections of the driving torque command section 41, the elapsed time determining section 43, and the start determining section 44 other than the engine speed determining section 42A are similar to those in the first embodiment.

A control procedure for a vehicle start in the controller of the electrically driven haulage vehicle according to the second embodiment will next be described with reference to FIG. 6. FIG. 6 is a flowchart illustrating an example of a control procedure at a time of a start in the controller of the electrically driven haulage vehicle according to the second embodiment illustrated in FIG. 5.

The control procedure of the controller 30A according to the second embodiment illustrated in FIG. 6 is different from the control procedure (see FIG. 3) of the controller 30 according to the first embodiment in the following respects. When a start instruction for the dump truck 1 is input, after step S20 in which a driving torque command corresponding to an accelerating instruction of the operating pedal 21 or the control station 60 is output to the inverter 14, the engine speed determining section 42A sets the engine speed threshold value Nth according to the loading weight of the load W (step S25). The engine speed threshold value Nth is thereby set to rise as the loading weight of the load W is increased. Further, the engine speed determining section 42A determines whether or not the engine speed Ne as a sensed value of the engine speed sensor 23 has exceeded the engine speed threshold value Nth set in step S25 (step S30A). In this case, because the engine speed threshold value Nth is set to rise as the loading weight of the load W is increased, whether the electric power generated by the generator 13 has reached electric power necessary to start the dump truck 1 can be determined accurately on the basis of the engine speed Ne. Incidentally, processing subsequent to step S30A (steps S40 to S60) is similar to that in the first embodiment.

According to the second embodiment described above, as in the first embodiment described above, whether or not the vehicle speed Vs has reached the speed threshold value Vth is determined after the elapsed time Ta (first elapsed time) from the time point at which the engine speed Ne reaches the engine speed threshold value Nth reaches the time threshold value Tth. It is thereby possible to determine whether or not the dump truck 1 (electrically driven haulage vehicle) is in contact with the vehicle stop 100 and is thus in a start impossible state with consideration given to the acceleration time from a start of movement of the dump truck 1 (electrically driven haulage vehicle) at a time of a start to the reaching of a travelling state that can be sensed by the vehicle speed sensor 24 (speed sensor). Thus, an error in the determination can be prevented. That is, it is possible to reliably determine the presence or absence of a start impossible state of the dump truck 1 (electrically driven haulage vehicle) caused by contact with the vehicle stop 100 at a time of a start of the vehicle.

In addition, the dump truck 1 (electrically driven haulage vehicle) according to the present embodiment further includes the pressure sensors 25 as a load sensor that senses the loading weight of the load W. In addition, the engine speed threshold value Nth is set to rise as the sensed values of the pressure sensors 25 as the load sensor increase.

According to this configuration, the engine speed threshold value Nth is not a predetermined value but is set according to the loading weight of the load W. The engine speed threshold value Nth is therefore an appropriate value taking an effect of the loading weight of the load W into consideration as an index for determining that the electric power generated by the generator 13 has reached electric power necessary to start the dump truck 1. It is therefore possible to reliably determine the presence or absence of a start impossible state of the dump truck 1 (electrically driven haulage vehicle) caused by contact with the vehicle stop 100 at a time of a start of the vehicle.

Modification of Second Embodiment

An electrically driven haulage vehicle according to a modification of the second embodiment of the present invention will next be described with reference to FIG. 7. FIG. 7 is a block diagram illustrating a general configuration of an electrically driven travelling system in the electrically driven haulage vehicle according to the modification of the second embodiment and a controller that controls the electrically driven travelling system. Incidentally, in FIG. 7, reference numerals same as the reference numerals illustrated in FIGS. 1 to 6 represent similar parts, and therefore, detailed description thereof will be omitted.

The electrically driven haulage vehicle according to the modification of the second embodiment illustrated in FIG. 7 is different from that of the second embodiment in the following respects. The engine speed determining section 42A of the controller 30A according to the second embodiment is configured to set the engine speed threshold value Nth according to the loading weight of the load W on the dump truck 1 (sensed values of the pressure sensors 25). On the other hand, an engine speed determining section 42B of a controller 30B according to the modification of the second embodiment is configured to set the engine speed threshold value Nth according to an inclination state (road surface gradient) at a start position of the dump truck 1.

When the road surface gradient represents an ascent with respect to a travelling direction at a vehicle start position of the dump truck 1, the electric power generated by the generator 13 which electric power is necessary to start the dump truck 1 is considered to increase by an amount corresponding to the hill climbing of the dump truck 1. The engine speed threshold value Nth as a determination index of the engine speed determining section 42B is used as an index of whether or not the electric power generated by the generator 13 has reached electric power necessary to start the dump truck 1. It is therefore preferable to set the engine speed threshold value Nth according to the magnitude of the road surface gradient at a start position instead of making the engine speed threshold value Nth a predetermined value.

A control function for preventing the slipping of the wheels is in widespread use in electrically driven haulage vehicles. Many electrically driven haulage vehicles are mounted with an acceleration sensor in order to implement the control function. The dump truck 1 according to the present embodiment also has an acceleration sensor 26.

The acceleration sensor 26, for example, senses an acceleration including a gravitational acceleration in a coordinate system fixed to the vehicle (dump truck 1), and is capable of sensing an inclination of the vehicle with respect to a horizontal plane by sensing the direction of gravity acting on the vehicle during a stationary time of the vehicle. That is, the acceleration sensor 26 functions as an inclination sensor capable of sensing the road surface gradient at the start position of the dump truck 1 by sensing the inclination of the vehicle with respect to the horizontal plane. The inclination sensor can be constituted by a sensor other than the acceleration sensor 26 as long as the sensor is capable of sensing the road surface gradient at the start position of the dump truck 1.

The engine speed determining section 42B of the controller 30B according to the present embodiment captures the inclination of the dump truck 1 with respect to the horizontal plane (road surface gradient) as a sensed value As of the acceleration sensor 26, and sets the engine speed threshold value Nth according to the magnitude of the sensed value As (road surface gradient) of the acceleration sensor 26. That is, the engine speed determining section 42B sets the engine speed threshold value Nth to rise as the road surface gradient as the sensed value As of the acceleration sensor 26 increases when the travelling direction of the dump truck 1 in a vehicle start instruction is a climbing direction. Therefore, whether or not the electric power necessary to start the dump truck 1 has been achieved can be determined accurately on the basis of the engine speed Ne for the condition of the road surface gradient at a time of a start of the dump truck 1.

Incidentally, in the controller 30B according to the present embodiment, the respective functional sections of the driving torque command section 41, the elapsed time determining section 43, and the start determining section 44 other than the engine speed determining section 42B are similar to those of the second embodiment. In addition, the control procedure of the controller 30B according to the modification of the second embodiment is similar to the control procedure illustrated in FIG. 6 in the controller 30A according to the second embodiment except that the engine speed determining section 42B sets the engine speed threshold value Nth according to the road surface gradient at the start position of the dump truck 1 in step S25.

According to the modification of the second embodiment described above, as in the second embodiment described above, it is possible to reliably determine the presence or absence of a start impossible state of the dump truck 1 (electrically driven haulage vehicle) caused by contact with the vehicle stop 100 at a time of a start of the vehicle.

In addition, the dump truck 1 (electrically driven haulage vehicle) according to the present embodiment further includes the acceleration sensor 26 as an inclination sensor capable of sensing the road surface gradient. In addition, the above-described engine speed threshold value Nth is set to rise as the sensed value As of the acceleration sensor 26 as the inclination sensor increases when the vehicle travelling direction of the vehicle start instruction is a climbing direction.

According to this configuration, the engine speed threshold value Nth is not a predetermined value but is set according to the road surface gradient of an ascent. The engine speed threshold value Nth is therefore an appropriate value taking an effect of the road surface gradient of the ascent into consideration as an index for determining that the electric power generated by the generator 13 has reached electric power necessary to start the dump truck 1. It is therefore possible to reliably determine the presence or absence of a start impossible state of the vehicle caused by contact with the vehicle stop 100 at a time of a start of the vehicle.

Third Embodiment

An electrically driven haulage vehicle according to a third embodiment of the present invention will next be described with reference to FIG. 8 and FIG. 9. Incidentally, in FIG. 8 and FIG. 9, reference numerals same as the reference numerals illustrated in FIGS. 1 to 7 represent similar parts, and therefore, detailed description thereof will be omitted. FIG. 8 is a block diagram illustrating a general configuration of an electrically driven travelling system in the electrically driven haulage vehicle according to the third embodiment and a controller that controls the electrically driven travelling system.

The electrically driven haulage vehicle according to the third embodiment illustrated in FIG. 8 is different from that of the first embodiment in the following respects. In the controller 30 according to the first embodiment, the elapsed time determining section 43 makes a determination by using the time threshold value Tth, which is a predetermined value set in advance. On the other hand, in a controller 30C according to the third embodiment, an elapsed time determining section 43C changes the setting of the time threshold value Tth as a determination index according to the loading weight of the load W on the dump truck 1.

A total weight of the dump truck 1 changes significantly according to the presence or absence of the load W. When the total weight of the dump truck 1 differs, a time taken for the vehicle speed Vs of the dump truck 1 to reach the speed threshold value Vth changes even when the electrically driven motor 11 applies the same driving torque to the rear wheels 4. It is known that, when the driving torque of the electrically driven motor 11 is constant, that is, when the acceleration of the vehicle is constant, the time taken to reach the predetermined speed is proportional to the total weight of the vehicle. That is, as the total weight of the dump truck 1 (loading weight of the load W) is increased, the time taken for the vehicle speed Vs of the dump truck 1 to reach the speed threshold value Vth is lengthened. Accordingly, it is preferable to set the time threshold value Tth according to a change in the total weight of the dump truck 1 (loading weight of the load W) instead of making the time threshold value Tth a predetermined value.

Specifically, the elapsed time determining section 43C captures the cylinder pressures Ps of the suspensions 7 and 8 as the sensed values of the pressure sensors 25 functioning as a load sensor, and calculates the loading weight of the load W or the total weight of the dump truck 1 including the loading weight of the load W on the basis of the sensed values Ps of the pressure sensors 25. The time threshold value Tth is set according to the magnitude of the loading weight of the load W or the total weight of the dump truck 1 as a calculation result. That is, the elapsed time determining section 43C sets the time threshold value Tth to be lengthened as the loading weight of the load W is increased. Incidentally, in the controller 30C according to the present embodiment, the respective functional sections of the driving torque command section 41, the engine speed determining section 42, and the start determining section 44 other than the elapsed time determining section 43C are similar to those in the first embodiment.

A control procedure at a time of a vehicle start in the controller of the electrically driven haulage vehicle according to the third embodiment will next be described with reference to FIG. 9. FIG. 9 is a flowchart illustrating an example of the control procedure at a time of a start in the controller of the electrically driven haulage vehicle according to the third embodiment illustrated in FIG. 8.

The control procedure of the controller 30C according to the third embodiment illustrated in FIG. 9 is different from the control procedure (see FIG. 3) of the controller 30 according to the first embodiment in the following respects. When a start instruction for the dump truck 1 is input, after it is determined that the engine speed Ne is equal to or higher than the engine speed threshold value Nth (after a determination of YES in step S30), the elapsed time determining section 43C sets the time threshold value Tth according to the loading weight of the load W or the total weight of the dump truck 1 (step S35). The time threshold value Tth is thereby set to be increased as the loading weight of the load W is increased. Further, the elapsed time determining section 43C determines whether or not the elapsed time Ta being measured has exceeded the time threshold value Tth set in step S35 (step S40C). In this case, because the time threshold value Tth is set to be increased as the loading weight of the load W is increased, the presence or absence of contact with the vehicle stop 100 can be determined with consideration given to a time for acceleration until the vehicle speed Vs of the dump truck 1 reaches the speed threshold value. Incidentally, processing (steps S10 to S30 and S50 to S60) other than step S35 and step S40C is similar to that in the first embodiment.

According to the third embodiment described above, as in the first embodiment described above, whether or not the vehicle speed Vs has reached the speed threshold value Vth is determined after the elapsed time Ta (first elapsed time) from the time point at which the engine speed Ne reaches the engine speed threshold value Nth reaches the time threshold value Tth. It is thereby possible to determine whether or not the dump truck 1 (electrically driven haulage vehicle) is in contact with the vehicle stop 100 and is thus in a start impossible state with consideration given to the acceleration time from a start of movement of the dump truck 1 (electrically driven haulage vehicle) at a time of a start to the reaching of a travelling state that can be sensed by the vehicle speed sensor 24 (speed sensor). Thus, an error in the determination can be prevented. That is, it is possible to reliably determine the presence or absence of a start impossible state of the dump truck 1 (electrically driven haulage vehicle) caused by contact with the vehicle stop 100 at a time of a start of the vehicle.

In addition, the dump truck 1 (electrically driven haulage vehicle) according to the present embodiment further includes the pressure sensors 25 as a load sensor that senses the loading weight of the load W. In addition, the above-described time threshold value Tth is set to be lengthened as the sensed values of the pressure sensors 25 as the load sensor increase.

According to this configuration, the time threshold value Tth is set according to the loading weight of the load W. The time threshold value Tth is therefore an appropriate value taking an effect of the loading weight of the load W into consideration as an index of an acceleration time from a start of movement of the vehicle to the reaching of a travelling state that can be sensed by the vehicle speed sensor 24. Hence, it is possible to reliably determine the presence or absence of a start impossible state of the vehicle caused by contact with the vehicle stop 100 at a time of a start of the vehicle.

First Modification of Third Embodiment

An electrically driven haulage vehicle according to a first modification of the third embodiment of the present invention will next be described with reference to FIG. 10. Incidentally, in FIG. 10, reference numerals same as the reference numerals illustrated in FIGS. 1 to 9 represent similar parts, and therefore, detailed description thereof will be omitted. FIG. 10 is a block diagram illustrating a general configuration of an electrically driven travelling system in the electrically driven haulage vehicle according to the first modification of the third embodiment and a controller that controls the electrically driven travelling system.

The electrically driven haulage vehicle according to the first modification of the third embodiment illustrated in FIG.

10 is different from that of the third embodiment in the following respects. The elapsed time determining section 43C of the controller 30C according to the third embodiment sets the time threshold value Tth according to the loading weight of the load W on the dump truck 1 or the total weight of the dump truck 1 (sensed values Ps of the pressure sensors 25 as a load sensor) (see FIG. 8). On the other hand, an elapsed time determining section 43D of a controller 30D according to the first modification of the third embodiment changes the setting of the time threshold value Tth according to a difference in travelling resistance of the road surface at the start position of the dump truck 1.

When the travelling resistance of the road surface at the start position of the dump truck 1 differs, a time taken for the vehicle speed Vs of the dump truck 1 to reach the speed threshold value Vth changes even when the electrically driven motor 11 applies the same driving torque to the rear wheels 4. That is, as the travelling resistance of the road surface is increased, the time taken for the vehicle speed Vs of the dump truck 1 to reach the speed threshold value Vth is lengthened. Therefore, in order to accurately determine the presence or absence of a start impossible state caused by contact of the dump truck 1 with the vehicle stop 100, it is preferable to set the time threshold value Tth defining a time point of the determination according to a difference in the travelling resistance of the road surface instead of making the time threshold value Tth a predetermined value. As for the travelling resistance, first, cited is a case in which the road surface gradient represents an ascent with respect to the travelling direction at the start position of the dump truck 1. Second, cited is a case in which, when the road surface is loosened due to mud or the like, mud thrusting resistance is increased at a time of travelling of the wheels.

Accordingly, the elapsed time determining section 43D, for example, captures the inclination of the dump truck 1 with respect to the horizontal plane (road surface gradient) as the sensed value As of the acceleration sensor 26 functioning as an inclination sensor, computes gradient resistance as the travelling resistance of the road surface according to the magnitude of the sensed value As (road surface gradient) of the acceleration sensor 26, and sets the time threshold value Tth on the basis of the gradient resistance as a computation result. In addition, as for the magnitude of the travelling resistance caused by a road surface state such as the thrusting resistance of a muddy road, information Sr regarding the road surface state of a work site such as an amount of rainfall of the site or image data of road surface conditions, for example, may be obtained from the control station 60. The elapsed time determining section 43D can also calculate the travelling resistance of the road surface state on the basis of the information Sr regarding the road surface state which information is input from the control station 60, and set the time threshold value Tth according to the travelling resistance of the road surface state as a calculation result. In addition, it is possible to set the time threshold value Tth according to the travelling resistance caused by the road surface gradient which travelling resistance is calculated on the basis of the sensed value of the acceleration sensor 26 and the travelling resistance of the road surface state which travelling resistance is calculated on the basis of the information Sr regarding the road surface state which information is input from the control station 60. It is consequently possible to accurately determine the presence or absence of a start impossible state caused by contact of the dump truck 1 with the vehicle stop 100, according to the magnitude of the travelling resistance of the road surface at a time of a start of the dump truck 1.

Incidentally, in the controller 30D according to the present embodiment, the respective functional sections of the driving torque command section 41, the engine speed determining section 42, and the start determining section 44 other than the elapsed time determining section 43D are similar to those in the third embodiment. In addition, a control procedure for a vehicle start in the controller 30D according to the first modification of the third embodiment is similar to the control procedure illustrated in FIG. 9 in the controller 30C according to the third embodiment except that the elapsed time determining section 43D sets the time threshold value Tth according to the travelling resistance at the start position of the dump truck 1 in step S35.

According to the first modification of the third embodiment described above, as in the third embodiment described above, it is possible to reliably determine the presence or absence of a start impossible state of the dump truck 1 (electrically driven haulage vehicle) caused by contact with the vehicle stop 100 at a time of a start of the vehicle.

In addition, in the present modification, the above-described time threshold value Tth is set to be lengthened as the travelling resistance of the road surface increases.

According to this configuration, the time threshold value Tth is set according to the travelling resistance of the road surface. The time threshold value Tth is therefore an appropriate value taking an effect of the travelling resistance of the road surface into consideration as an index of an acceleration time from a start of movement of the vehicle to the reaching of a travelling state that can be sensed by the vehicle speed sensor 24. Hence, it is possible to reliably determine the presence or absence of a start impossible state of the vehicle caused by contact with the vehicle stop 100 at a time of a start of the vehicle.

In addition, the dump truck 1 (electrically driven haulage vehicle) according to the present modification further includes the acceleration sensor 26 as an inclination sensor capable of sensing the road surface gradient. The travelling resistance of the road surface is travelling resistance corresponding to the road surface gradient which travelling resistance is calculated on the basis of the road surface gradient sensed by the acceleration sensor 26 as the inclination sensor.

According to this configuration, the time threshold value Tth is an appropriate value taking an effect of the travelling resistance corresponding to the road surface gradient into consideration as an index of an acceleration time from a start of movement of the vehicle to the reaching of a travelling state that can be sensed by the vehicle speed sensor 24.

In addition, in the present modification, the travelling resistance of the road surface is travelling resistance corresponding to the road surface state, the travelling resistance being calculated on the basis of the information Sr regarding the road surface state, the information Sr being input from the control station 60 (outside).

According to this configuration, the time threshold value Tth is an appropriate value taking an effect of the travelling resistance corresponding to the road surface state of a muddy road or the like into consideration as an index of an acceleration time from a start of movement of the vehicle to the reaching of a travelling state that can be sensed by the vehicle speed sensor 24.

Second Modification of Third Embodiment

An electrically driven haulage vehicle according to a second modification of the third embodiment of the present invention will next be described with reference to FIG. 11 and FIG. 12. Incidentally, in FIG. 11 and FIG. 12, reference numerals same as the reference numerals illustrated in FIGS. 1 to 10 represent similar parts, and therefore, detailed description thereof will be omitted. FIG. 11 is a block diagram illustrating a general configuration of an electrically driven travelling system in the electrically driven haulage vehicle according to the second modification of the third embodiment and a controller that controls the electrically driven travelling system.

The electrically driven haulage vehicle according to the second modification of the third embodiment illustrated in FIG. 11 is different from that of the third embodiment in the following respects. The elapsed time determining section 43C of the controller 30C according to the third embodiment sets the time threshold value Tth according to the loading weight of the load W on the dump truck 1 or the total weight of the dump truck 1 (sensed values Ps of the pressure sensors 25) (see FIG. 8). On the other hand, an elapsed time determining section 43E of a controller 30E according to the second modification of the third embodiment changes the setting of the time threshold value Tth according to the length of an elapsed time Te taken for the engine speed Ne to reach the engine speed threshold value Nth after a start instruction is input.

The torque of the engine 12 is not only used to raise the rotational speed of the engine 12 itself but also used to drive the generator 13 (generate electric power). Therefore, depending on the magnitude of a starting load on the dump truck 1, it may take a long time to raise the engine speed. As described above, the travelling driving force demanded of the electrically driven motor 11 is increased according to the magnitude of the loading weight of the load W, the magnitude of the travelling resistance of the ascent gradient or the muddy road, and the like. When the travelling driving force demanded of the electrically driven motor 11 for a start of the vehicle is increased, the generated electric power demanded of the generator 13 is also correspondingly increased. In this case, the magnitude of the torque of the engine 12 for driving the generator 13 inevitably increases, and the engine speed Ne becomes correspondingly difficult to rise, and tends to take a relatively long elapsed time to reach a predetermined value.

Accordingly, the elapsed time determining section 43E of the controller 30E according to the present modification measures the elapsed time Te taken for the engine speed Ne to reach the engine speed threshold value Nth after the input of a start instruction, and sets the time threshold value Tth on the basis of the elapsed time Te as a measurement result. Thus, unlike the third embodiment and the first modification thereof, it is possible to set the time threshold value Tth taking into consideration the loading weight of the load W, the travelling resistance of the road surface, and the like that affect the determination of whether or not the vehicle has started to move, without capturing the sensed values Ps of the pressure sensors 25, the sensed value As of the acceleration sensor 26, the information Sr regarding the travelling resistance of the road surface state from the control station 60, or the like.

A control procedure at a time of a vehicle start in the controller of the electrically driven haulage vehicle according to the second modification of the third embodiment will next be described with reference to FIG. 12. FIG. 12 is a flowchart illustrating an example of the control procedure at a time of a start in the controller of the electrically driven haulage vehicle according to the second modification of the third embodiment illustrated in FIG. 11.

The control procedure of the controller 30E according to the second modification of the third embodiment illustrated in FIG. 12 is different from the control procedure (see FIG. 9) of the controller 30C according to the third embodiment in the following respects. When a start instruction for the dump truck 1 is input, after step S20 in which a driving torque command corresponding to an accelerating instruction of the operating pedal 21 or the control station 60 is output to the inverter 14, the elapsed time determining section 43E starts to measure the elapsed time Te of a rise in the engine speed Ne (step S27). Further, the elapsed time determining section 43E measures the elapsed time Te until a time point at which it is determined that the engine speed Ne has risen to the engine speed threshold value Nth (YES in step S30), and sets the time threshold value Tth on the basis of the elapsed time Te (elapsed time until the engine speed Ne reaches the engine speed threshold value Nth from a time point of the input of the start instruction) as a measurement result (step S35E). Thus, the time threshold value Tth is set to be lengthened as the elapsed time Te taken for the engine speed Ne to rise to the engine speed threshold value Nth becomes longer. In this case, the time threshold value Tth is set according to the loading weight of the load W and the travelling resistance, and therefore, it is possible to accurately determine the presence or absence of a start impossible state caused by contact of the dump truck 1 with the vehicle stop 100. Incidentally, processing (steps S10 to S20, S30, and S40 to S60) other than steps S27 and S35E is similar to that in the third embodiment.

According to the second modification of the third embodiment described above, as in the third embodiment described above, it is possible to reliably determine the presence or absence of a start impossible state of the dump truck 1 (electrically driven haulage vehicle) caused by contact with the vehicle stop 100 at a time of a start of the vehicle.

In addition, in the present modification, the elapsed time determining section 43E is configured to further measure the elapsed time Te (second elapsed time) from the input of a vehicle start instruction to a time point at which the engine speed determining section 42 determines that the sensed value Ne of the engine speed sensor 23 is equal to or higher than the engine speed threshold value Nth. The above-described time threshold value Tth is set to be lengthened as the measured elapsed time Te (second elapsed time) becomes longer.

According to this configuration, the time threshold value Tth is set according to the elapsed time Te taken for the engine speed Ne to rise to the engine speed threshold value Nth. Thus, the time threshold value Tth as an index of an acceleration time from a start of movement of the vehicle to the reaching of a travelling state that can be sensed by the vehicle speed sensor 24 can be set to be an appropriate value without the use of the sensors for sensing the loading weight of the load W and the road surface gradient, for example, the pressure sensors 25 as the inclination sensor in the third embodiment and the acceleration sensor 26 in the first modification of the third embodiment.

Other Embodiments

It is to be noted that the present invention is not limited to the foregoing first to third embodiments and the modifications of these embodiments and includes various modifications. The foregoing embodiments are described in detail to describe the present invention in an easily understandable manner, and are not necessarily limited to embodiments including all of the described configurations. For example, a part of a configuration of a certain embodiment can be replaced with a configuration of another embodiment, and a configuration of another embodiment can be added to a configuration of a certain embodiment. In addition, for a part of a configuration of each embodiment, another configuration can be added, deleted, or substituted.

For example, the configurations of the foregoing second embodiment and the modification thereof can be combined with each other. That is, the engine speed determining section of the controller can also be configured to change the setting of the engine speed threshold value Nth according to the two conditions of the loading weight of the load W on the dump truck 1 and an inclination state (road surface gradient) at the start position of the dump truck 1.

In addition, the configurations of the foregoing third embodiment and the first modification thereof can be combined with each other. That is, the elapsed time determining section of the controller can also be configured to change the setting of the time threshold value Tth according to the two conditions of the loading weight of the load W on the dump truck 1 and the travelling resistance of the road surface at the start position of the dump truck 1.

In addition, the configuration of the foregoing second embodiment or the modification thereof and the configuration of the third embodiment or the first modification thereof can be combined with each other. That is, the engine speed determining section of the controller can also be configured to change the setting of the engine speed threshold value Nth according to at least one of the two conditions of the loading weight of the load W on the dump truck 1 and the inclination state (road surface gradient) at the start position of the dump truck 1, and the elapsed time determining section of the controller can also be configured to change the setting of the time threshold value Tth according to at least one of the two conditions of the loading weight of the load W on the dump truck 1 and the travelling resistance of the road surface at the start position of the dump truck 1.

In addition, the configuration of the foregoing second embodiment or the modification thereof and the configuration of the second modification of the third embodiment can be combined with each other. That is, the engine speed determining section of the controller can also be configured to change the setting of the engine speed threshold value Nth according to at least one of the two conditions of the loading weight of the load W on the dump truck 1 and the inclination state (road surface gradient) at the start position of the dump truck 1, and the elapsed time determining section of the controller can also be configured to change the setting of the time threshold value Tth according to the length of the elapsed time Te taken for the engine speed Ne to reach the engine speed threshold value Nth.

In addition, some or the whole of the respective functions of the controllers 30, 30A, 30B, 30C, 30D, and 30E according to the foregoing embodiments may be implemented by hardware by making design thereof by an integrated circuit, for example.

In addition, in the foregoing embodiments, an example has been illustrated in which the electrically driven motor 11 is constituted by an induction motor. However, the present invention can be applied even when the electrically driven motor 11 is a synchronous motor.

DESCRIPTION OF REFERENCE CHARACTERS

1: Dump truck (electrically driven haulage vehicle)
11: Electrically driven motor
12: Engine
13: Generator
23: Engine speed sensor
24: Vehicle speed sensor (speed sensor)
25: Pressure sensor (load sensor)
26: Acceleration sensor (inclination sensor)
30, 30A, 30B, 30C, 30D, 30E: Controller
42, 42A, 42B: Engine speed determining section
43, 43C, 43D, 43E: Elapsed time determining section
44: Start determining section
60: Control station (outside)
W: Load
Nth: Engine speed threshold value
Tth: Time threshold value
Vth: Speed threshold value
Ta: Elapsed time (first elapsed time)
Te: Elapsed time (second elapsed time)

The invention claimed is:

1. An electrically driven haulage vehicle comprising:
an engine;
a generator that is mechanically driven by the engine;
an electrically driven motor that is driven by electric power supplied from the generator;
an engine speed sensor that senses a rotational speed of the engine;
a speed sensor that senses a vehicle speed; and
a controller that controls the driving of the electrically driven motor;
the electrically driven haulage vehicle transporting a load by travelling by a driving force of the electrically driven motor;
the controller including
an engine speed determining section configured to determine whether or not a sensed value of the engine speed sensor is equal to or higher than an engine speed threshold value when a vehicle start instruction is input,
an elapsed time determining section configured to measure a first elapsed time from a time point at which the engine speed determining section determines that the sensed value of the engine speed sensor is equal to or higher than the engine speed threshold value, and determine whether or not the first elapsed time has reached a time threshold value, and
a start determining section configured to determine whether or not a sensed value of the speed sensor is equal to or higher than a speed threshold value after the elapsed time determining section determines that the first elapsed time has reached the time threshold value;
the controller being configured to stop the electrically driven motor when the start determining section determines that the sensed value of the speed sensor is lower than the speed threshold value.

2. The electrically driven haulage vehicle according to claim 1, further comprising:
a load sensor that senses a loading weight of the load,
wherein the engine speed threshold value is set to be raised as a sensed value of the load sensor increases.

3. The electrically driven haulage vehicle according to claim 1, further comprising:
an inclination sensor capable of sensing a road surface gradient,
wherein the engine speed threshold value is set to be raised as a sensed value of the inclination sensor increases when a vehicle travelling direction of the vehicle start instruction is a climbing direction.

4. The electrically driven haulage vehicle according to claim 1, further comprising:

a load sensor that senses a loading weight of the load, wherein the time threshold value is set to be lengthened as a sensed value of the load sensor increases.

5. The electrically driven haulage vehicle according to claim 1, wherein the time threshold value is set to be lengthened as travelling resistance of a road surface increases.

6. The electrically driven haulage vehicle according to claim 5, further comprising:

an inclination sensor capable of sensing a road surface gradient, wherein the travelling resistance of the road surface is travelling resistance calculated on a basis of the road surface gradient sensed by the inclination sensor.

7. The electrically driven haulage vehicle according to claim 5, wherein the travelling resistance of the road surface is travelling resistance calculated on a basis of information regarding a road surface state, the information being input from an outside.

8. The electrically driven haulage vehicle according to claim 1, wherein the elapsed time determining section is configured to further measure a second elapsed time from the input of the vehicle start instruction to the time point at which it is determined that the sensed value of the engine speed sensor is equal to or higher than the engine speed threshold value, and the time threshold value is set to be lengthened as the measured second elapsed time becomes longer.

* * * * *